(12) United States Patent
Takahashi et al.

(10) Patent No.: US 10,384,128 B2
(45) Date of Patent: Aug. 20, 2019

(54) OBJECT PLACING GAME WITH CHARACTER BATTLES

(71) Applicant: BANDAI NAMCO Entertainment Inc., Tokyo (JP)

(72) Inventors: Ryoji Takahashi, Yokohama (JP); Yoshiyuki Danbara, Tokyo (JP)

(73) Assignee: BANDAI NAMCO Entertainment Inc., Tokyo (JP)

( * ) Notice: Subject to any disclaimer, the term of this patent is extended or adjusted under 35 U.S.C. 154(b) by 37 days.

(21) Appl. No.: 15/702,808

(22) Filed: Sep. 13, 2017

(65) Prior Publication Data

US 2018/0071632 A1 Mar. 15, 2018

(30) Foreign Application Priority Data

Sep. 14, 2016 (JP) .................. 2016-179781

(51) Int. Cl.
| | |
|---|---|
| *A63F 13/00* | (2014.01) |
| *A63F 13/55* | (2014.01) |
| *A63F 13/2145* | (2014.01) |
| *A63F 13/25* | (2014.01) |
| *A63F 13/35* | (2014.01) |
| *A63F 13/525* | (2014.01) |
| *A63F 13/42* | (2014.01) |

(52) U.S. Cl.
CPC .......... *A63F 13/55* (2014.09); *A63F 13/2145* (2014.09); *A63F 13/25* (2014.09); *A63F 13/35* (2014.09); *A63F 13/525* (2014.09); *A63F 13/42* (2014.09); *A63F 2300/5533* (2013.01)

(58) Field of Classification Search
None
See application file for complete search history.

(56) References Cited

FOREIGN PATENT DOCUMENTS

JP 5947714 B2 6/2016

OTHER PUBLICATIONS

"VGA Planets Homepage". From vgaplanets.com via The Way Back Machine (www.archive.org). [dated Apr. 6, 2016]. [online], [retrieved on Jan. 4, 2019]. Retrieved from the Internet <URL: https://web.archive.org/web/20160406220056/http://www.vgaplanets.com/index.htm>. 5 pages.*

(Continued)

*Primary Examiner* — Lawrence S Galka
(74) *Attorney, Agent, or Firm* — Posz Law Group, PLC

(57) ABSTRACT

Provided is a game system including: a first game processing means for placing, based on an operation by a player, an object in a virtual space of the player, and executing a first game that progresses by using the object; a second game processing means for causing an enemy character to appear in the virtual space, and executing a second game that causes the enemy character and a player character, which have satisfied a given condition, to fight a battle; and a game management means for executing processing for permitting the player to perform an operation relating to the second game when it is judged that the given condition has been established in the virtual space during the execution of the first game, and reflecting a result of the battle in the second game in a parameter to be used in the first game.

19 Claims, 13 Drawing Sheets

(56) References Cited

OTHER PUBLICATIONS

"Donovans—What is VGA Planets". From donovansvgap.com via The Way Back Machine (www.archive.org). [dated Nov. 25, 2012]. [online], [retrieved on Jan. 4, 2019]. Retrieved from the Internet <URL: https://web.archive.org/web/20121125034327/http://www.donovansvgap.com/newbie/whattheheck.htm>. 2 pages.*

"Donovans—Building an empire". From donovansvgap.com via The Way Back Machine (www.archive.org). [dated Jun. 20, 2015]. [online], [retrieved on Jan. 4, 2019]. Retrieved from the Internet <URL: https://web.archive.org/web/20150620004142/http://www.donovansvgap.com:80/newbie/building.htm>. 1 page.*

"Donovans—Supply units". From donovansvgap.com via The Way Back Machine (www.archive.org). [dated Jun. 20, 2015]. [online], [retrieved on Jan. 4, 2019]. Retrieved from the Internet <URL: https://web.archive.org/web/20150620011012/http://www.donovansvgap.com:80/newbie/supplies.htm>. 1 page.*

"Donovans—Host config". From donovansvgap.com via The Way Back Machine (www.archive.org). [dated Sep. 24, 2015]. [online], [retrieved on Jan. 4, 2019]. Retrieved from the Internet <URL: https://web.archive.org/web/20150924163625/http://www.donovansvgap.com:80/help/hostconfig.htm>. 5 pages.*

"Donovans—Gather". From donovansvgap.com via The Way Back Machine (www.archive.org). [dated May 6, 2016]. [online], [retrieved on Jan. 4, 2019]. Retrieved from the Internet <URL: https://web.archive.org/web/20150828031158/http://www.donovansvgap.com:80/help/combat.htm>. 1 page.*

"Donovans—Scores". From donovansvgap.com via The Way Back Machine (www.archive.org). [dated May 6, 2016]. [online], [retrieved on Jan. 4, 2019]. Retrieved from the Internet <URL: https://web.archive.org/web/20150828031158/http://www.donovansvgap.com:80/help/combat.htm>. 1 page.*

"VGA Planets 3—Lizard planets CAN take 150% danage", [dated Jun. 19, 2011]. [online], [retrieved Jan. 4, 2019]. Retrieved from the Internet <URL:https://www.youtube.com/watch?v=NQA69euTy1o>. 1 page.*

"Wikipedia: Tom Clancy's The Division". From Wikipedia, The Free Encylopedia. [dated Aug. 30, 2016]. [online], [retrieved on Jan. 4, 2019]. Retrieved from the Internet <URL:https://en.wikipedia.org/w/index.php?title=Tom_Clancy%27s_The_Division&oldid=736810456>. 9 pages.*

"Gamespot review". From gamespot.com via The Way Back Machine (www.archive.org). [dated Mar. 13, 2016]. [online], [retrieved on Jan. 4, 2019]. Retrieved from the Internet <URL: https://web.archive.org/web/20160717082335/https://www.gamespot.com/reviews/tom-clancys-the-division-review/1900-6416380/>. 12 pages.*

"The Division Base of Operations Walkthrough", [dated Jan. 16, 2016]. [online], [retrieved Jan. 4, 2019]. Retrieved from the Internet <URL: https://www.youtube.com/watch?v=Mvz55tbSxbI>. 1 page.*

"Tom Clancy's The Division Lets Play Part 1", [dated Jan. 28, 2016]. [online], [retrieved Jan. 4, 2019]. Retrieved from the Internet <URL:https://www.youtube.com/watch?v=9OoE8zwl5fk>. 1 page.*

"Donovans—Combat". From donovansvgap.com via The Way Back Machine (www.archive.org). [dated Aug. 28, 2015]. [online], [retrieved on Jan. 4, 2019]. Retrieved from the Internet <URL: https://web.archive.org/web/20150828031158/http://www.donovansvgap.com:80/help/combat.htm>. 6 pages.*

Take-off!! Hero Base, iPhone AC extra report, Jul. 26, 2016. URL: http://iphoneac-blog.com/archives/9310615.html (and partial English translation).

Take-off!! Hero Base, Game, Cairo Software, youtube, Aug. 17, 2016. URL: https://www.youtube.com/watch?v=a-qA_JAsViE (and partial English translation).

"World Trigger Smash Borders"—At Last Distribution is started! boomApp Games, Jul. 28, 2015. URL: https://game.boom-app.com/entry/worldtrigger_sb-review (and partial English translation).

"Evangelion-Soul Catharsis Special Feature" Surprise App, Aug. 7, 2016. URL: http://dengekionline.com/elem/000/882/882758/ (and partial English translation).

Qbist K.K. Qbist, Se-Mook Sengoku IXA Official Guidebook "Guidebook" First edition, Square Enix Co., Ltd. Koji Taguchi, Feb. 17, 2011, Edition 1, p. 10, 16, 42-43, 51 (and partial English translation).

Kessen, Ao No Sangokushi Kouryaku Wiki May 29, 2015, searched on Mar. 26, 2019, URL, https://wikiwiki.jp/aono3gokushi/決戦 (and partial English translation).

\* cited by examiner

| CITY BUILDING GAME PARAMETERS ||||||| OVERALL PROGRESS SITUATION (LEVEL) |
|---|---|---|---|---|---|---|
| FACILITY PARAMETERS ||||||| |
| IDENTIFI- CATION NUMBER | FACILITY ATTRIBUTE | POSITION COORDINATES | PROGRESS SITUATION (LEVEL) | ENEMY OCCUPATION SITUATION || |
| | | | | OCCUPATION FLAG | ENEMY CHARACTER | |
| ID001 | FACTORY | (X1,Y1,Z1) | LV1 | ON | ID001 | LV1 |
| ID002 | CONNECTED FACILITY | (X2,Y2,Z2) | LV3 | OFF | – | |
| ID003 | RESIDENCE | (X3,Y3,Z3) | LV2 | OFF | – | |
| ⋮ | ⋮ | ⋮ | ⋮ | ⋮ | ⋮ | |

FIG.12

| BATTLE GAME PARAMETERS |||||||
|---|---|---|---|---|---|---|
| PLAYER CHARACTER PARAMETERS |||| CARD PARAMETERS |||
| IDENTIFI- CATION NUMBER | CHARACTER ATTRIBUTE | LEVEL | NUMBER OF SLOTS | IDENTIFI- CATION NUMBER | CARD ATTRIBUTE | CARD STRENGTH |
| ID001 | ATTRIBUTE A | LV1 | 3 | C1 | STRENGTH | MEDIUM |
| ID002 | ATTRIBUTE B | LV2 | 3 | C2 | TECHNIQUE | STRONG |
| ID003 | ATTRIBUTE B | LV15 | 4 | C3 | SPEED | WEAK |
| ⋮ | ⋮ | ⋮ | ⋮ | ⋮ | ⋮ | ⋮ |

FIG.13

OBJECT PLACING GAME WITH CHARACTER BATTLES

Japanese Patent Application No. 2016-179781, filed on Sep. 14, 2016, is hereby incorporated by reference in its entirety.

BACKGROUND OF INVENTION

The present invention relates to a game system, a server, and an information storage medium.

In recent years, with the increase in the number of functions and improvement in the performance of those functions in information communication terminal devices, for example, tablet-type information communication terminal devices and smartphones, and with the spread of such information communication terminal devices, opportunities for executing games on those terminal devices are increasing. Among such games, simulation games (hereinafter referred to as "city building game") have been popular for a long time (see, for example, Japanese Patent No. 5947714). In a simulation game, a player places objects such as facilities and construction objects in a virtual space allocated to the player, and, for example, develops the city by causing the virtual space to undergo changes over time (e.g., population movement and construction progress) based on conditions (e.g., supply destination, supply timing, and supply amount of capital, material, resources, and people) set by the player. The reason for the popularity is that such city building games provide the player with the enjoyment of participating in the development and the decline of a city.

However, in games relating to, for example, the development of a space, such as a city building game, the player basically controls the city at a desired pace, and hence a player who is looking for a sense of high speed, thrills, or other such strong stimulation may feel that the game is lacking. Therefore, for such games, it has been considered that it is important to include ways of preventing the player from becoming bored, such as creating elaborate plans for the style and feel of the city or increasing the variety of objects that can be used to build the city.

SUMMARY

The present invention is capable of providing a game system and the like, which are capable of more strongly attracting a player to a game relating to, for example, development of a space, by providing timely and effective variety in the game.

According to a first aspect of the present invention, there is provided a game system including:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

According to a second aspect of the present invention, there is provided a server including:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

According to a third aspect of the present invention, there is provided a computer-readable non-transitory information storage medium having stored thereon a program for causing a computer to implement a game, the program causing the computer to function as:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

BRIEF DESCRIPTION OF THE SEVERAL VIEWS OF THE DRAWING

FIG. 12 is a table for illustrating parameters of the city building game.

FIG. 13 is a table for illustrating parameters of the battle game.

Figure 1:
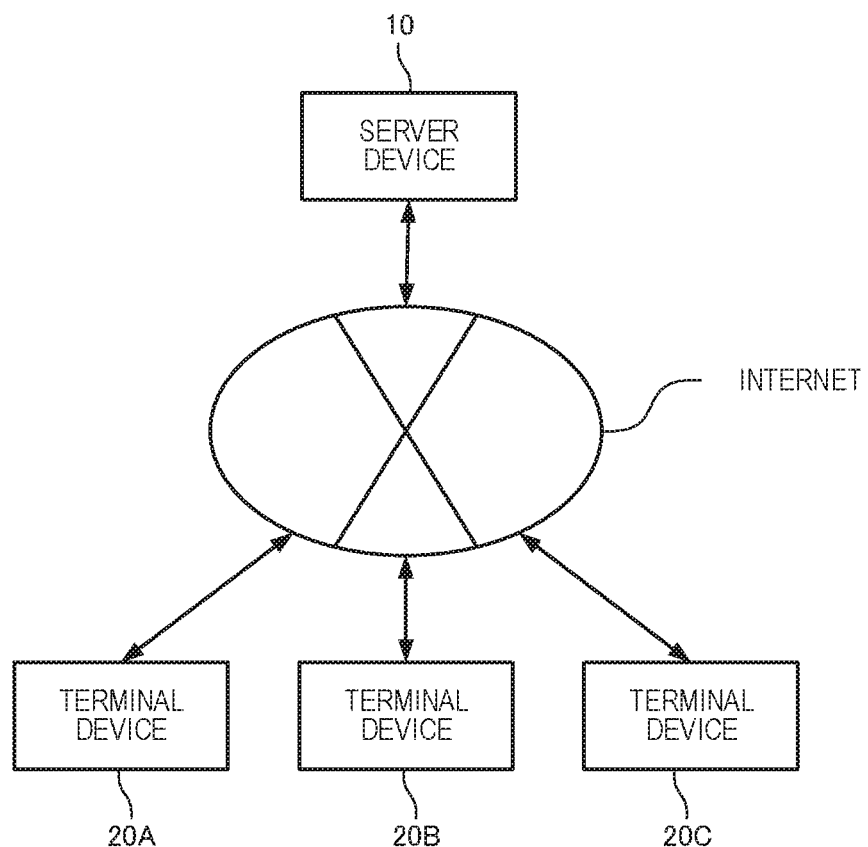
FIG. 1 is a diagram for illustrating an example of a configuration of a game system according to one embodiment of the present invention.

DETAILED DESCRIPTION OF THE EMBODIMENT (1) According to one embodiment of the present invention, there is provided a game system including:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

(2) The game system may further include an input reception section which starts, when it is judged that the given condition has been established, reception processing for receiving operation input relating to the second game.

(3) The game system according to Item (1) may further include display control means for enabling, when it is judged that the given condition has been established, a display screen of given display means to be switched from a first game screen relating to the first game to a second game screen relating to the second game.

(4) The game system according to Item (2) may further include display control means for enabling, when it is judged that the given condition has been established, a display screen of given display means to be switched from a first game screen relating to the first game to a second game screen relating to the second game.

The term "virtual space of the player" used herein refers to an object space in which the player can participate in the first game, and the virtual space of the player may be the whole area or a part of the area to be used in the first game. For example, the player can control a layout of the objects in the virtual space of that player. The player can also control the conditions (environment) of the virtual space. The virtual space may be a two-dimensional object space, or may be a three-dimensional object space.

The term "object" used herein refers to an object that is placeable by the player in the virtual space. For example, when it is assumed that developed land is at least a part of the area of the virtual space, examples of the placeable objects in the virtual space include facility objects such as factories, parks, artificial lakes, residences, and buildings. When it is assumed that farms, arable land, green spaces, forests, and woods are at least a part of the area of the virtual space, the placeable objects in the virtual space may be plant and animal objects such as seeds and seedlings or livestock. When it is assumed that cosmic space is at least a part of the area of the virtual space, the placeable objects in the virtual space may be module objects such as residence modules, experiment modules, and food storage modules.

The meaning of the term "progress" used herein may include at least any one of development, evolution, growth, building, formation, construction, creation, and proliferation (hereinafter referred to as "development and the like" as appropriate) of each individual object included in the virtual space, or of the virtual space itself. The term "progress" may also include any one of progress mainly performed by the player, progress performed based on an automatic calculation by the first game processing means under given conditions or conditions set by the player, and progress performed by the player and the first game processing means operating together.

The "battle" used herein may be any one of a battle in which a player character performs combat actions in real time in accordance with operations by the player, and a battle in which a player character performs combat actions based on an automatic calculation by the second game processing means.

The term "player character" used herein may refer to a single player character or a plurality of player characters owned by the player. A player character of other players (another player) can participate in the battle on the player character side.

The "enemy character" used herein may be an enemy character automatically generated by the second game processing means. The "enemy character" may also be a player character of other players (another player).

The "result of the battle" used herein may include at least one of information indicating the winner or the loser of the battle, information indicating a magnitude of damage suffered by the player character or the enemy character in the battle, or information on equipment lost by the player character or the enemy character in the battle.

The "parameter to be used in the first game" used herein refers to at least one parameter to be used in the first game, and may be, for example, a parameter for accelerating or restricting progress (development and the like) in the first game.

As a result, according to this embodiment, while the player is playing a first game relating to development and the like of his or her own virtual space, when an enemy character appears in that virtual space, the player can start to play a second game in which his or her character fights the enemy character. The screen of the display means switches from a first game screen to a second game screen at a timing when it is judged that the given condition has been established, and hence the psychological state of the player can be immediately and forcibly moved from a stable psychological state of "enjoying development and the like" to a tense psychological state of "going into battle".

Further, in this embodiment, the result of the battle in the second game is reflected in a parameter of the first game, and hence the player can also get a sense that he or she is "participating in the first game" when the player plays the second game. For example, by controlling the parameter in a direction that restricts progress in the first game when the player character loses, the player can be provided with a real sense that his or her own virtual space is being protected by his or her own player character.

Therefore, according to this embodiment, by providing timely and effective variety in a game relating to development and the like of a space, the player can be more strongly attracted to the game.

In this case, the player is permitted to perform operations in the second game as a result of the switch in screens, and hence a player who started operations at a good timing can be provided with an advantage in the battle. Therefore, according to this embodiment, the player's sense of tension when an enemy character appears can be boosted.

(5) In the game system, the display control means may specify, when causing the display means to display the second game screen, an object present in an area relating to the battle in the virtual space, and perform control for causing the display means to display at least a part of the object as a background of the second game screen.

Therefore, the player can be provided with a sense that the battle in the second game is being performed in the virtual space of the first game based on a simple image generation technology.

(6) In the game system, the display control means may generate, when causing the display means to display the second game screen, an image of the virtual space by using a virtual camera arranged in an area relating to the battle in the virtual space, and perform control for causing the display means to display the image as a background of the second game screen.

Therefore, the player can reliably be provided with a sense that the battle in the second game is being performed in the virtual space of the first game.

(7) In the game system, the display means may be a touch panel display, and the display control means may start, when it is judged that the given condition has been established, display of an image for operation input relating to the second game.

Therefore, as a result of the start of the display of the image for operation input, the player can recognize that operations in the second game have been permitted.

(8) In the game system, the display control means may end, when it is judged that the battle has ended, the display of the image for operation input relating to the second game.

Therefore, as a result of the end of the display of the image for operation input, the player can recognize that operations in the second game have been prohibited.

The display control means may perform processing for causing given display means to display the second game screen relating to the second game during the execution of the second game, and switching, when it is judged during the display that the battle has ended, the display screen of the display means from the second game screen to the first game screen relating to the first game.

(9) In the game system, the game management means may determine, when it is judged that a plurality of combinations of the enemy character and the player character capable of fighting are present simultaneously in the virtual space, a battle order of the plurality of combinations based on a given criterion.

The term "given criterion" used herein refers to, for example, a criterion such as "start the battle in order from a combination satisfying a given condition".

As a result, the player can fight a plurality of enemy characters in order by using a plurality of player characters.

(10) In the game system, the game management means may set, when it is judged that a plurality of combinations of the enemy character and the player character capable of fighting are present simultaneously in the virtual space, a battle order of the plurality of combinations to an order designated by the player.

As a result, the player can fight a plurality of enemy characters in order by using a plurality of player characters. The player can also set the order of battles to a desired order.

(11) In the game system, the game management means may determine the enemy character to be caused to appear in the virtual space based on a parameter indicating a progress situation of the first game.

In this case, the opponent in the second game changes (e.g., becomes stronger) as the first game progresses, and hence the player can be provided with a strong sense that the first game and the second game are linked.

(12) In the game system, the game management means may set an appearance frequency of an enemy character in the virtual space based on a parameter indicating a progress situation of the first game.

In this case, the frequency of execution of the second game changes (e.g., becomes higher) as the first game progresses, and hence the player can be provided with a strong sense that the first game and the second game are linked.

(13) In the game system, the game management means may determine the enemy character to be caused to appear in the virtual space in accordance with a player character capable of being introduced by the player into the virtual space.

In this case, the enemy character changes when the player character capable of being introduced into the virtual space changes (e.g., the combat strength of the enemy character increases), and hence the player can enjoy a competitive battle.

(14) In the game system, the game management means may execute processing for changing, when it is judged that the enemy character won the battle, a parameter of the first game such that progress in the first game is restricted.

In this case, the progress in the first game is restricted unless the player character wins in the second game, and hence the player can be provided with a real sense that his or her own virtual space is being protected by the player character.

(15) In the game system, the game management means may continue the restriction during a period from when it is judged that the enemy character won the battle until it is next judged that the player character wins the battle.

Therefore, unless the player character wins in the second game, the progress in the first game continues to be restricted during the period until the next time the player character wins, and hence the player can be provided with a sense that his or her own virtual space is being occupied (controlled) by the enemy character.

(16) In the game system, the game management means may include:

specification means for specifying a given object present in an area relating to the battle;

association means for storing, when it is judged that the enemy character won the battle, information for associating the given object and the enemy character in given storage means;

association release means for releasing the association when it is judged that the player character has won a next battle relating to the given object;

restriction means for performing restriction on at least the given object relating to the association; and restriction release means for releasing the restriction when the association of the given object has been released.

The term "given object" used herein refers to all or a part of the objects present in the area. For example, when objects having various attributes are present in the area, an object having a specific attribute may be specified as the given object.

Therefore, the game management means is capable of providing to the player a sense of occupation by the enemy character for each object.

(17) In the game system, the game management means may execute processing for changing, when a specific object appearing in the virtual space has been acquired by the player, a parameter relating to a combat strength of the player character.

Examples of the "specific object" include one or more objects appearing in the virtual space when a predetermined condition has been satisfied as a result of the progress in the first game.

Examples of the "parameter relating to a combat strength of the player character" include the player character per se that can be introduced into the virtual space, a level (combat strength) of the player character, an item that the player character can be equipped with, an upper limit of the level (combat strength) of the player character, and the number of slots of the player character.

Therefore, according to the present invention, when the player plays the first game, the player can be provided with a sense that he or she is "participating in the second game". For example, when the combat strength of the player character can be increased by a specific object that appears in the virtual space only when the first game has progressed to a certain level or further, the player can be provided with a real sense that the progress in the first game works in a beneficial manner for the second game.

(18) In the game system, the game management means may execute processing for causing a player character of another player having a given relation with the player to participate in the battle on a side of the player character, and conferring to the another player a special advantage in accordance with at least one of a result of the battle or a parameter indicating a progress situation of the first game.

Therefore, at least one of the result of the second game or the progress situation of the first game is linked to the advantage (or the disadvantage) of the other player, and hence the attention of the other player can be drawn to at least one of the first game or the second game.

For example, when a special advantage is to be conferred to another player only if the player character side wins, the another player who has confidence in his or her ability to participate in the battle can be strongly attracted.

For example, when a special advantage that has a higher value when there has been more progress in the first game is to be conferred to another player, the attention of the another player can be drawn to the progress situation of the first game, and hence the another player can be more strongly attracted to the second game when there has been more progress in the first game.

(19) According to one embodiment of the present invention, there is provided a server, including:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

(20) According to one embodiment of the present invention, there is provided a computer-readable non-transitory information storage medium having stored thereon a program for causing a computer to implement a game, the program causing the computer to function as:

first game processing means for placing, based on an operation by a player, an object in a virtual space of the player, and executing a first game that progresses by using the object;

second game processing means for causing an enemy character to appear in the virtual space, and executing a second game that causes the enemy character and a player character, which have satisfied a given condition, to fight a battle; and game management means for executing processing for permitting the player to perform an operation relating to the second game when it is judged that the given condition has been established in the virtual space during the execution of the first game, and reflecting a result of the battle in the second game in a parameter to be used in the first game.

Therefore, according to this embodiment, by providing timely and effective variety in the game relating to development and the like of a space, a player can be more strongly attracted to the game.

The functions of the above-mentioned game system can also be divided among a plurality of devices. A part or all of the functions of the game system may be included in a terminal device capable of connecting to a network. A part or all of the above-mentioned program can also be recorded on an information storage medium.

An exemplary embodiment of the present invention is described below. The exemplary embodiment described below does not in any way limit the scope of the present invention defined by the claims laid out herein. Further, all of the elements described below in connection with the exemplary embodiment should not necessarily be taken as essential elements of the present invention.

1. Game System

An outline and a schematic configuration of a game system 1 according to one embodiment of the present invention are described below with reference to FIG. 1. FIG. 1 is a diagram for illustrating an example of a configuration of the game system 1.

As illustrated in FIG. 1, the game system 1 includes a server device 10 (an example of a server) which provides a game service and a plurality of terminal devices 20A, 20B, 20C, . . . . The server device 10 provides the game service and each of the plurality of terminal devices 20A, 20B, 20C . . . can be connected to the Internet (an example of a network). The following description focuses on, of the plurality of terminal devices 20A, 20B, 20C . . . a terminal device capable of being operated by a player (the terminal device capable of being operated by that player is hereinafter referred to simply as "terminal device 20").

The player can access the server device 10 from the terminal device 20, and play a game transmitted from the server device 10 via the Internet. The player can also access the server device 10 from the terminal device 20 to communicate to and from another player.

The server device 10 is an information processing device capable of providing a service that allows the player to play the game using the terminal device 20 that is communicably connected to the server through the Internet. The server device 10 may also function as a social networking service (SNS) server which provides a communication-type service. The SNS server is, for example, an information processing device which provides a service that allows a plurality of players to communicate to and from each other.

When the server device 10 functions as the SNS server, for example, the server device 10 can provide a game that is referred to as a social game, which is implemented by utilizing the operating environment (e.g., application programming interface (API) or platform) provided by the SNS.

In particular, the server device 10 can provide a game that is provided on a web browser that runs on the terminal device 20, for example, a browser game (i.e., a game that starts when the user has opened the game website using the web browser) written in a suitable language such as HTML, FLASH, CGI, PHP, shockwave. Java (trademark) applet, or JavaScript (trademark).

The term "social game" used herein includes a game that does not require dedicated client software unlike existing online games, and can be played using only a web browser and an SNS account. The server device 10 may have a configuration which can provide an online game that is designed so that each terminal connects to a terminal (e.g., smartphone, personal computer, or game device) of another player through a network, and the terminals simultaneously share the progress of the game online.

The server device 10 may include a single device or processor, or may include a plurality of devices or processors.

Information, for example, game information, that is stored in a storage area (storage section 140 described later) of the server device 10 may be stored in a database (storage device or memory in a broad sense) that is connected to the server device 10 through a network (intranet or Internet). When the server device 10 functions as the SNS server, information, for example, user information 146, that is stored in the storage area may be stored in a database (storage device or memory in a broad sense) that is connected to the server device 10 through a network (intranet or Internet).

Specifically, the server device 10 receives input information based on an operation by the player, who is the user of the terminal device 20, and to perform game processing based on the received input information. The server device 10 transmits a game processing result to the terminal device 20. The terminal device 20 performs various kinds of processing for providing to the terminal device 20 the game processing result received from the server device 10. As a result of this processing, the player can view the game processing result.

The terminal device 20 is an information processing device such as a smartphone, a mobile phone, a PHS, a computer, a tablet PC, a game device, a PDA, a portable game machine, or an image generation device, and can connect to the server device 10 through a network such as the Internet (WAN) or a LAN. The terminal device 20 and the server device 10 may be connected to each other through a cable communication channel, or may be connected to each other through a wireless communication channel.

The terminal device 20 is provided with a web browser that allows the player to browse a web page (HTML format data). Specifically, the terminal device 20 has a communication control function for communicating to and from the server device 10, a web browser function for performing display control using data (e.g., web data or HTML data) received from the server device 10, and other functions. Further, the terminal device 20 performs various kinds of processing for providing a game screen to the player, and allows the player to play the game. The terminal device 20 may acquire game control information from the server device 10, and perform predetermined game processing to implement a game based on the game processing.

More specifically, when the terminal device 20 has transmitted a game play request to the server device 10, the terminal device 20 is connected to the game website provided by the server device 10, and the game starts. The terminal device 20 causes the server device 10 that functions as an SNS server to perform predetermined processing, or to acquire the user information 146 that is managed by the server device 10 that functions as an SNS server, optionally using an API, to thereby implement the game.

2. Server Device

Figure 2:
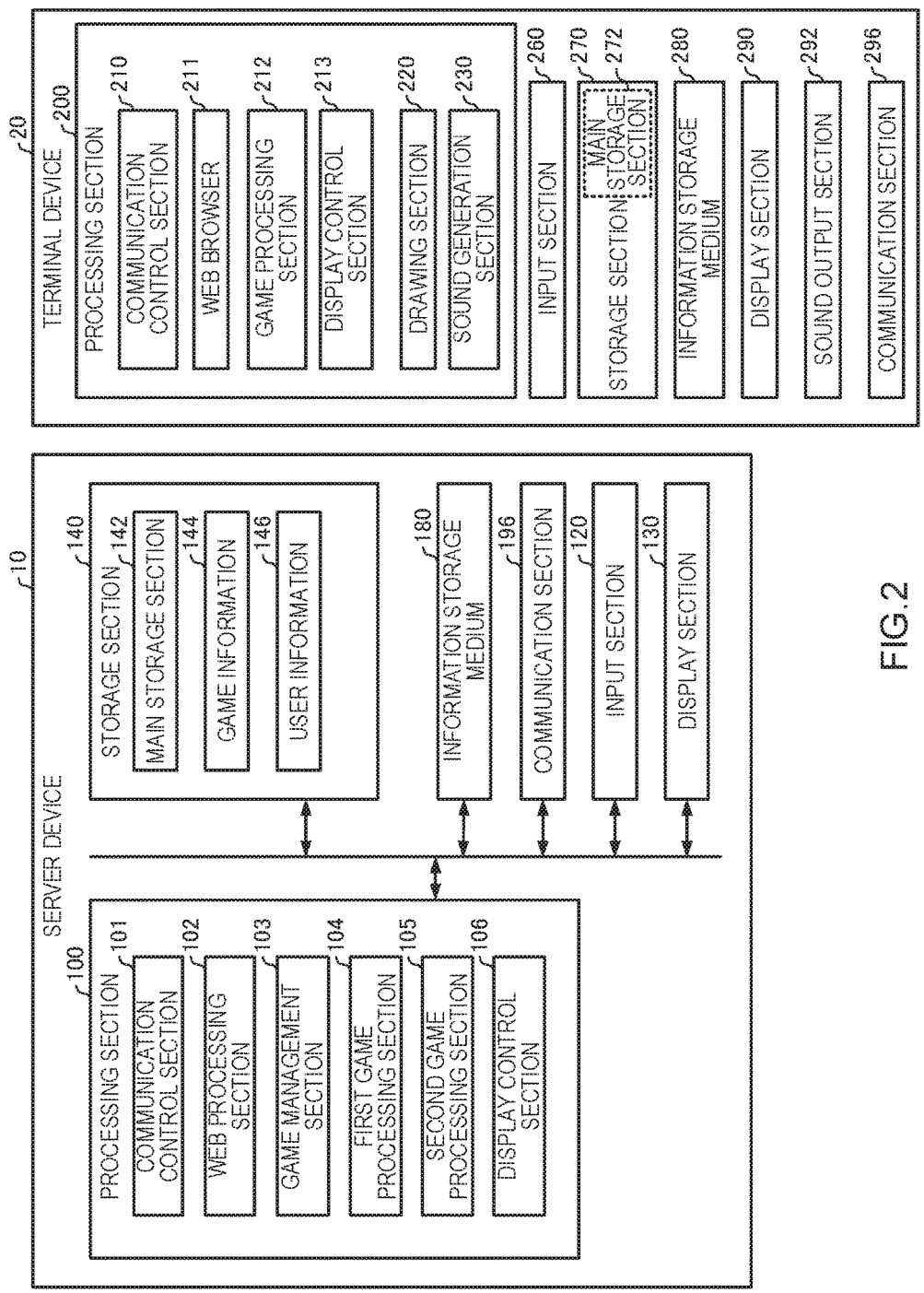
FIG. 2 is a functional block diagram for illustrating a server device and a terminal according to one embodiment of the present invention.

The server device 10 is described below with reference to FIG. 2. The server device 10 may have a configuration in which some of the elements (sections) illustrated in FIG. 2 are omitted.

The server device 10 includes an input section 120 which allows the administrator and the like to input information, a display section 130 which displays a predetermined screen, an information storage medium 180 which stores predetermined information, a communication section 196 which communicates to and from the terminal device 20 and the like, a processing section 100 which mainly performs processing for implementing the game that is provided by the server device 10, and a storage section 140 (which corresponds to storage means) which mainly stores various types of data used to implement the game.

The input section 120 allows the system administrator and the like to input game settings, other necessary settings, and data. For example, the input section 120 is implemented by a mouse, a keyboard, or the like.

The display section 130 displays an operation screen for the system administrator. For example, the display section 130 is implemented by a liquid crystal display or the like.

The information storage medium 180 (computer-readable medium) stores a program, data, and the like. The function of the information storage medium 180 is implemented by an optical disc (CD or DVD), a magneto-optical disk (MO), a magnetic disk, a hard disk, a magnetic tape, a memory (ROM), or the like.

The communication section 196 performs various kinds of control processing for communicating to and from the outside (e.g., terminal, another server, or another network system). The function of the communication section 196 is implemented by hardware such as a processor or a communication ASIC, a program, or the like.

The storage section 140 serves as a work area for the processing section 100, the communication section 196, and the like. The function of the storage section 140 is implemented by a RAM (VRAM) or the like. The information stored in the storage section 140 may be managed using a database. The storage section 140 stores game information 144, which holds information on the games (in this embodiment, a first game and a second game are collectively referred to as "games"), user information 146, which holds information on each player, and various kinds of other information necessary for game calculations.

The processing section 100 performs various kinds of processing using a main storage section 142 included in the storage section 140 as a work area. The function of the processing section 100 may be implemented by hardware such as various kinds of processors (e.g., CPU or DSP) or an ASIC (e.g., gate array), or a program.

The processing section 100 performs various kinds of processing of this embodiment based on programs (data) stored in the information storage medium 180. Specifically, a program for causing a computer to function as each section of this embodiment is stored in the information storage medium 180.

For example, the processing section 100 (processor) controls the entire server device 10 based on programs stored in the information storage medium. The processing section 100 also performs various kinds of processing, for example, controlling data transfer between sections. The processing section 100 also performs processing for providing various services in response to a request from the terminal device 20.

Specifically, the processing section 100 includes a communication control section 101, a web processing section 102, a game management section 103 (which corresponds to game management means), a first game processing section 104 (which corresponds to first game processing means), a second game processing section 105 (which corresponds to second game processing means), and a display control section 106 (which corresponds to display control means). A portion of those constituent parts may be omitted from the processing section 100.

The communication control section 101 performs processing for exchanging data with the terminal device 20 through the Internet. Specifically, the server device 10 performs various kinds of processing based on information received from the terminal device 20 and the like through the communication control section 101.

In particular, the communication control section 101 performs processing for transmitting a game screen to the terminal device 20 of the player based on a request from the terminal device 20 of the player.

The web processing section 102 functions as a web server. For example, the web processing section 102 performs processing for transmitting data by means of a communication protocol, for example, Hypertext Transfer Protocol (HTTP). The transmission of data is performed in response to a request from a web browser 211 installed on the terminal device 20. The web processing section 102 also performs processing for receiving the data transmitted by the web browser 211 of the terminal device 20.

Although an example in which the server device 10 also functions as the SNS server is described below, the server device 10 may be implemented by a game server and an SNS server that are provided separately from each other. A part or all of the game processing in this embodiment may be performed by the server device 10, and a part of the game processing may be performed by the terminal device 20.

The first game processing section 104 executes, under the control of the game management section 103, and in cooperation with the terminal device 20, processing of the first game (hereinafter referred to as "city building game") based on the parameters of the city building game and operations by the player, who is the operator of the terminal device 20. The parameters of the city building game are stored in the storage section 140 as a part of the user information 146. The parameters stored in the storage section 140 are managed by the game management section 103. The details of the city building game and the parameters are described later.

The second game processing section 105 executes, under the control of the game management section 103, and in cooperation with the terminal device 20, processing of the second game (hereinafter referred to as "battle game") based on the parameters of the battle game and operations by the player, who is the operator of the terminal device 20. The parameters of the battle game are stored in the storage section 140 as a part of the user information 146. The parameters stored in the storage section 140 are managed by the game management section 103. The details of the battle game and the parameters are described later.

The game management section 103 executes processing for managing a parameter to be used in the city building game and a parameter to be used in the battle game. The game management section 103 also executes processing for controlling the first game processing section 104, processing for controlling the second game processing section 105, and processing for controlling the display control section 106. Operation of the game management section 103 is described in more detail later.

The display control section 106 executes, under the control of the game management section 103, processing for generating a display image and processing for controlling a timing for switching the image, for example. The display image includes an image to be transmitted to the terminal device 20 via the web processing section 102 and the communication section 196. Operation of the display control section 106 is described in more detail later.

3. Terminal Device

The terminal device 20 according to one embodiment of the present invention is described below with reference to FIG. 2. The terminal device 20 may have a configuration in which some of the elements (sections) illustrated in FIG. 2 are omitted.

An input section 260 is a device to be used by the player to input input information. The input section 260 outputs the input information from the player to a processing section 200. Examples of the input section 260 include a lever, a button, a steering wheel, a microphone, a touch panel display, a keyboard, and a mouse.

A storage section 270 serves as a work area for the processing section 20X), a communication section 296, and the like. The function of the storage section 270 may be implemented by a RAM (VRAM) or the like. A portion of the storage section 270 is a main storage section 272 to be used as a work area for the processing section 200.

An information storage medium 280 stores a program, data, and the like. The function of the information storage medium 280 may be implemented by an optical disc (CD or DVD), a magneto-optical disk (MO), a magnetic disk, a hard disk, a magnetic tape, a memory (ROM), or the like. The information storage medium 280 is capable of storing a program for causing the processing section 200 to function.

A display section 290 (which corresponds to display means) outputs an image generated in the terminal device 20. The function of the display section 290 may be implemented by a CRT, an LCD, a touch panel display, a head-mounted display (HMD), and the like. A sound output section 292 outputs a sound generated in this embodiment. The function of the sound output section 292 may be implemented by a speaker, headphones, or the like.

The communication section 296 performs various kinds of control processing for communicating to and from the outside (e.g., another terminal and server). The function of the communication section 296 may be implemented by hardware such as various kinds of processors or a communication ASIC, a program, or the like.

The processing section 200 (processor) performs game processing, display control, image generation processing, sound generation processing, or the like, based on the input information from the input section 260 and programs (data) stored in the information storage medium 280. The processing section 200 uses the main storage section 272 in the storage section 270 as a work area when executing the various kinds of processing. The processing section 200 executes processing for receiving the programs, game data, and the like stored in the storage section 140 or the information storage medium 180 of the server device 10 via the Internet, and storing the received program, game data, and the like in the information storage medium 280 or the storage section 270 of the terminal device 20. The functions of the processing section 200 may be implemented by hardware, such as various kinds of processors (e.g., CPU or DSP) or an ASIC (e.g., gate array), or by a program.

The processing section 200 includes a communication control section 210, the web browser 211, a game processing section 212, a display control section 213, a drawing section 220, and a sound generation section 230. A portion of those constituent parts may be omitted from the processing section 200.

The communication control section 210 performs processing for transmitting and receiving data to and from the server device 10. The communication control section 210 performs processing for storing data received from the server device 10 in the storage section 270, processing for analyzing the received data, and control processing relating to the transmission and reception of other data. The communication control section 210 may perform processing for storing and managing in the information storage medium 280 address information on the server (IP address and port number). The communication control section 210 may perform communication to and from the server device 10 when input information on communication starting has been received from the player.

In particular, the communication control section 210 performs processing for transmitting identification information on the player to the server device 10, and receiving data (e.g., player web page or game screen) relating to the user information 146 from the server device 10. For example, the communication control section 210 performs processing for receiving data including information on another player that has a friendly relationship with the player (e.g., name of another player or presented information on another player) from the server device 10.

The communication control section 210 may transmit and receive data to and from the server device 10 in a predetermined cycle. The communication control section 210 may transmit and receive data to and from the server device 10 when input information has been received from the input section 260. In particular, the communication control section 210 performs processing for receiving the game screen from the server device 10.

The web browser 211 is an application program for viewing a web page (game screen). The web browser 211 downloads HTML files, image files, and the like from the server device 10 or another web server, and to analyze, display, and control the layout. The web browser 211 transmits data by using an input form (e.g., link, button, or text box) to the server device 10 or another web server.

The web browser 211 is capable of implementing a browser game. For example, the web browser 211 may implement a program written in, for example, JavaScript (trademark), FLASH, or Java (trademark), which has been received from the server device 10.

The terminal device 20 is capable of causing the web browser 211 to display information from a web server designated by a URL via the Internet. For example, the terminal device 20 causes the web browser 211 to display a game screen (e.g., HTML data) received from the server device 10.

The game processing section 212 performs various kinds of game calculation processing. Examples of such game calculation processing may include processing for starting the game when a game start condition has been satisfied, processing for causing the game to progress, and processing for ending the game when a game end condition has been satisfied.

The game processing section 212 may perform processing for arranging and setting various objects (objects constructed from geometric primitives such as polygons, free-form surfaces, or subdivision surfaces) representing a display object, for example, a player character, a building, a ballpark, a vehicle, a tree, a pillar, a wall, or a map (geographical feature) in the object space.

The term "object space" used herein refers to a virtual space, and includes a virtual two-dimensional space and a virtual three-dimensional space. The two-dimensional space is, for example, a space in which an object is placed at two-dimensional coordinates (X, Y), and the three-dimensional space is, for example, a space in which an object is placed at three-dimensional coordinates (X, Y. Z).

The drawing section 220 performs drawing processing based on the results of various kinds of processing (e.g., game processing) performed by the processing section 200 to generate an image, and output the generated image to the display section 290 using the display control section 213. The drawing section 220 may generate a two-dimensional image, or may generate a three-dimensional image.

The display control section 213 performs processing for displaying the game screen generated by the drawing section 220 on the display section 290. For example, the display control section 213 may use the web browser 211 when displaying the game screen.

4. Method of Embodiment 4-1. Outline and Assumptions of Embodiment

First, in the game system according to one embodiment of the present invention, the first game processing section 104 of the server device 10 places, based on an operation by the player, an object in the virtual space of the player. The first game processing section 104 executes a city building game that is progressing by using that object (refer to the block at the upper left of FIG. 3).

The above-mentioned city building game is based on the assumptions that developed land is at least a part of the area of the virtual space, and that the placeable objects in the virtual space are facilities such as factories, parks, artificial lakes, residences, and buildings. In the city building game, the player can participate in the whole area or a part of the area of the virtual space to be used in the city building game. The area in which the player can participate is hereinafter simply referred to as the "virtual space".

The player can, for example, control the number, the type, the layout and the like of the facilities in the virtual space.

The player can also control the supply destination, the supply amount, and the introduction timing of capital, material, resources, people, and the like as the conditions (environment) of the virtual space. The virtual space may be a two-dimensional object space. However, in FIG. 5 to FIG. 10 described later, there is illustrated an example of a three-dimensional object space.

The first game processing section 104 performs automatic calculations based on the conditions set by the player (supply destination, supply timing, and supply amount of capital, material, resources, people, and the like set by the player). The first game processing section 104 develops the virtual space and the facilities by causing the virtual space and the facilities to undergo changes over time (e.g., population movement and construction progress). That is, the city building game is also a type of so-called simulation game.

The first game processing section 104 can also prevent as necessary the conditions of the virtual space from being changed in order to temporarily prohibit player participation. The first game processing section 104 can also disrupt (change) the conditions of the virtual space as necessary in order to cause an event that is not expected by the player to occur.

The display control section 106 of the server device 10 generates, by operating in cooperation with the first game processing section 104, the game screen (city building game screen) relating to the city building game. This city building game screen (which corresponds to a first game screen) is sequentially transmitted to the terminal device 20 via the web processing section 102 and the communication control section 101. Specifically, in the above-mentioned game system, the city building game screen is displayed on the display section 290 of the terminal device 20.

Figure 3:
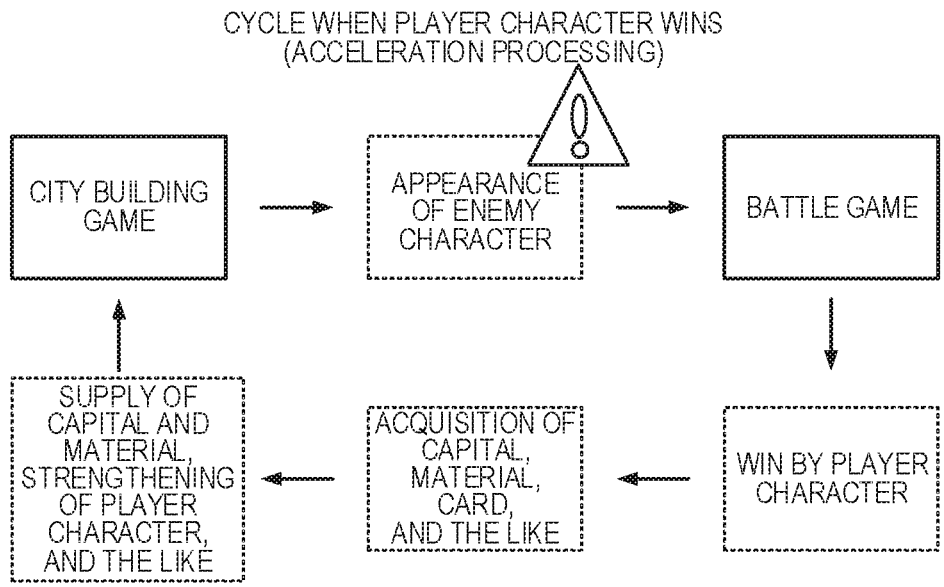
FIG. 3 is a diagram for illustrating a correlation (when a player character won a battle) between a city building game and a battle game in one embodiment of the present invention.

The second game processing section 105 of the server device 10 causes an enemy character to appear in the virtual space of the city building game (refer to the upper center block of FIG. 3). The second game processing section 105 executes a battle game that causes the enemy character and the player character, which have satisfied a given condition in the virtual space, to fight (refer to the upper right block of FIG. 3). The display control section 106 generates, by operating in cooperation with the second game processing section 105, the game screen (battle game screen) relating to the battle game. This battle game screen (which corresponds to a second game screen) is sequentially transmitted to the terminal device 20 via the web processing section 102 and the communication control section 101. Specifically, in the above-mentioned game system, the battle game screen is displayed on the display section 290 of the terminal device 20.

The battle game in one embodiment of the present invention is assumed to be an action game in which the player character performs combat actions in real time in response to operations by the player. The player character in the battle is, in general, a single player character or a plurality of player characters owned by the player. However, a player character that can be operated by other players (another player) may be allowed to participate in the battle on the player character side (collaborative play, which is described later). The enemy character in the battle may be a player character that can be operated by other players (another player). However, in this embodiment, the enemy character is assumed as being an enemy character automatically generated by the second game processing section 105.

The display control section 106 of the server device 10 causes the display section 290 of the terminal device 20 to display the city building game screen relating to the city building game during execution of the city building game. The display control section 106 executes, when it is judged that a predetermined condition has been satisfied in the virtual space during the display, processing for switching the display screen of the display section 290 from the city building game screen to the battle game screen relating to the battle game (refer to the upper right block of FIG. 3).

Figure 4:
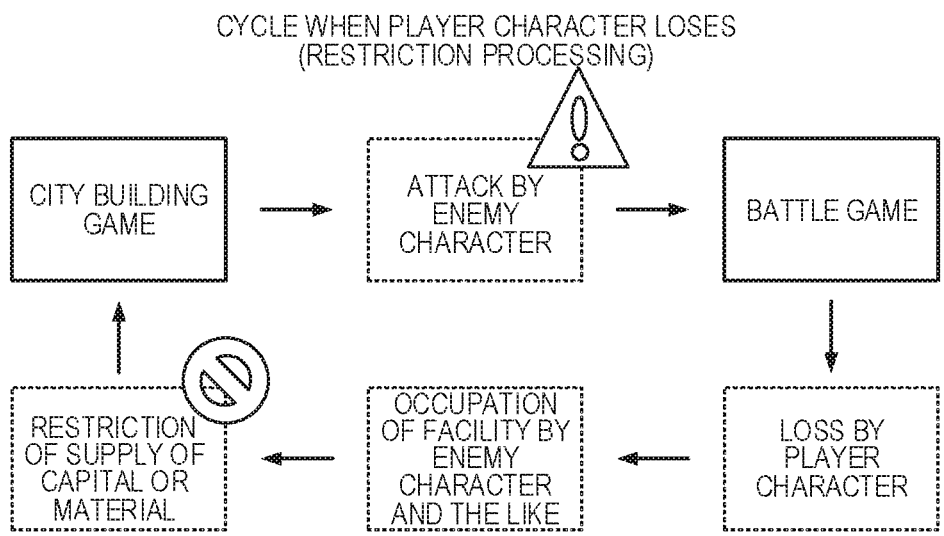
FIG. 4 is a diagram for illustrating a correlation (when the player character lost the battle) between the city building game and the battle game in one embodiment of the present invention.

The game management section 103 of the server device 10 executes processing for reflecting the result of the battle in the battle game in a parameter to be used in the city building game (refer to the lower blocks of FIG. 3). The result of the battle is, in general, information indicating the winner or the loser of the battle. However, the result may also include information indicating a magnitude of damage suffered by the player character or the enemy character in the battle, or information on equipment lost by the player character or the enemy character in the battle. The parameter to be used in the city building game is at least one of the parameters that are used in the city building game. The parameter to be used is, for example, a parameter (e.g., occupation flag, capital, material, resources, and people, which are described later) for accelerating or restricting progress (e.g., development) in the city building game. Therefore, the game management section 103 is capable of, for example, controlling the parameter in a direction that accelerates progress in the city building game when the player character wins (refer to the cycle indicated by the arrows in FIG. 3). The game management section 103 is also capable of controlling the parameter in a direction that restricts progress in the city building game when the player character loses (refer to the cycle indicated by the arrows in FIG. 4).

In the following description, the data communication speed between the server device 10 and the terminal device 20 performed via the Internet is assumed to be sufficiently high. Therefore, the display control section 106 of the server device 10 is capable of displaying the game image in real time on the display section 290 of the terminal device 20, and the player can transmit instructions from the player in real time to the processing section 100 of the server device 10.

When the display control section 106 of the server device 10 displays a game image to the display section 290 of the terminal device 20, the data for display of that game image passes through, before being transmitted to the display section 290 from the display control section 106, the web processing section 102, the communication control section 101, the communication section 196, the Internet, the communication section 296, the communication control section 210, the web browser 211, and the display control section 213, for example. However, in the following description, the details of how the data for display travels are omitted.

When the player transmits an instruction to the processing section 100 of the server device 10, the instruction passes through, before being transmitted to the processing section 100 from the player, the input section 260, the communication control section 210, the communication section 296, the Internet, the communication section 196, and the communication control section 101, for example. However, in the following description, the details of how the instruction travels are omitted.

4-2 Flow of Overall Game

The flow of the overall game is now described with reference to FIG. 5 to FIG. 11 relating to the game screen. In the following description, there is described an example in which a touch panel display is used as the input section 260 and the display section 290.

4-2-1. Game Screen Relating to City Building

Figure 5:
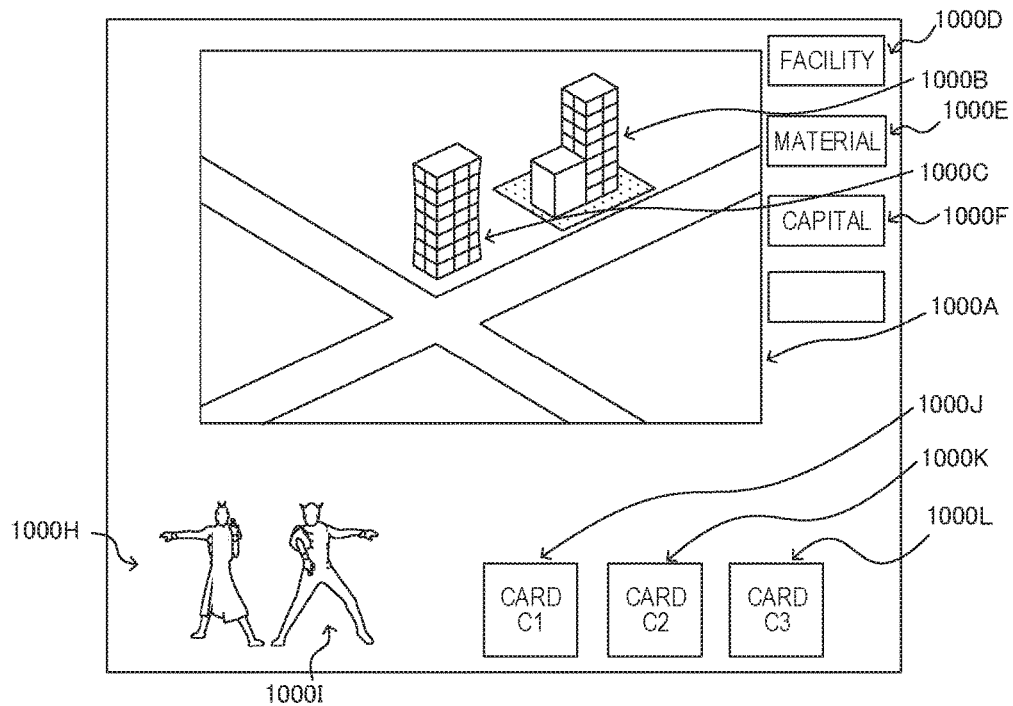
FIG. 5 is a diagram for illustrating a game screen of the city building game in one embodiment of the present invention.

First, when the game starts, the first game processing section 104 starts execution of the city building game, and the display control section 106 starts display of the city building game screen (FIG. 5) on the display section 29). A display area of a virtual space 1000A of the city building game is provided on the city building game screen (FIG. 5). Control of the perspective (position and direction of the virtual camera) and control of the magnification of the virtual space 1000A in the city building game screen (FIG. 5) are known technologies, and hence a description thereof is omitted here.

The player places facilities 1000B, 1000C, and the like at desired positions of the virtual space 1000A based on a combination of, for example, a touch operation on a given button 1000D arranged on the city building game screen (FIG. 5), a touch operation on the virtual space 1000A in the game screen (FIG. 5), and a drag operation on the city building game screen.

The player can also input an instruction to supply capital, material, resources, people, and the like to a desired facility in the virtual space 1000A based on a combination of a touch operation on given buttons 1000E and 1000F arranged on the game screen (FIG. 5), and a touch operation on one of the desired facilities 1000B and 1000C placed in the virtual space 1000A.

The capital, material, resources, people, and the like that can be used by the player are restricted to being in the range of the capital, material, resources, people, and the like possessed by the player. The capital, material, resources, people, and the like possessed by the player increase or decrease based on progress in the city building game and the results of the battle game. The parameters relating to the capital, material, resources, people, and the like possessed by the player are held in the user information 146, for example, of the storage section 140, and managed by the game management section 103 (the parameters relating to the capital, material, resources, people, and the like possessed by the player are not shown in FIG. 12, which is described later).

The game management section 103 manages the parameters relating to the supply amount of each of the capital, material, resources, people, and the like for each facility. Further, the game management section 103 changes, in accordance with the supply amount, the parameter of the supply amount for the facility that is the supply destination of the capital, material, resources, people, and the like. The parameters relating to the supply amounts of each of the capital, material, resources, people, and the like for each facility are held in the user information 146, for example, of the storage section 140, and managed by the game management section 103 (the parameters relating to the supply amounts of capital, material, resources, people, and the like are not shown in FIG. 12, which is described later).

The game management section 103 manages the supply amounts of each of the capital, material, resources, people, and the like for each facility in the user information 146, and when a facility having a supply amount that has reached a given upper limit is detected, raises the parameter (level) indicating the progress situation of that facility. The parameter indicating the progress situation of the facility is held in the user information 146, and managed by the game management section 103 (refer to FIG. 12).

Meanwhile, the display control section 106 monitors in the user information 146 the progress situation (level) for each facility. Further, when a facility having a progress situation (level) that has reached a given upper limit is detected, the display control section 106 changes the appearance of that facility on the city building game screen. In FIG. 5, the progress situation (level) of the facilities 1000B and 1000C is a high level (completed level). When the progress situation (level) of the facilities 1000B and 1000C is a low level, the appearance of the facilities 1000B and 1000C looks like vacant land. When the progress situation (level) of the facilities 1000B and 1000C is a medium level, the appearance of the facilities 1000B and 1000C looks like an under-construction building.

The game management section 103 may execute, when it is judged that capital and material have been supplied to a factory (type of facility) placed in the virtual space 1000A of the city building game, and that the parameter (level) indicating the progress situation of the factory has reached a given level (completed level), processing for dramatically increasing the amount of material possessed by the player by causing the material to be mass-produced at that factory (self-sufficient cycle).

4-2-2. Screen Relating to Enemy Character Appearance

Next, the second game processing section 105 of the server device 10 causes an enemy character 1000G to appear in the virtual space 1000A at a randomly-generated timing or at a given timing.

Figure 6:
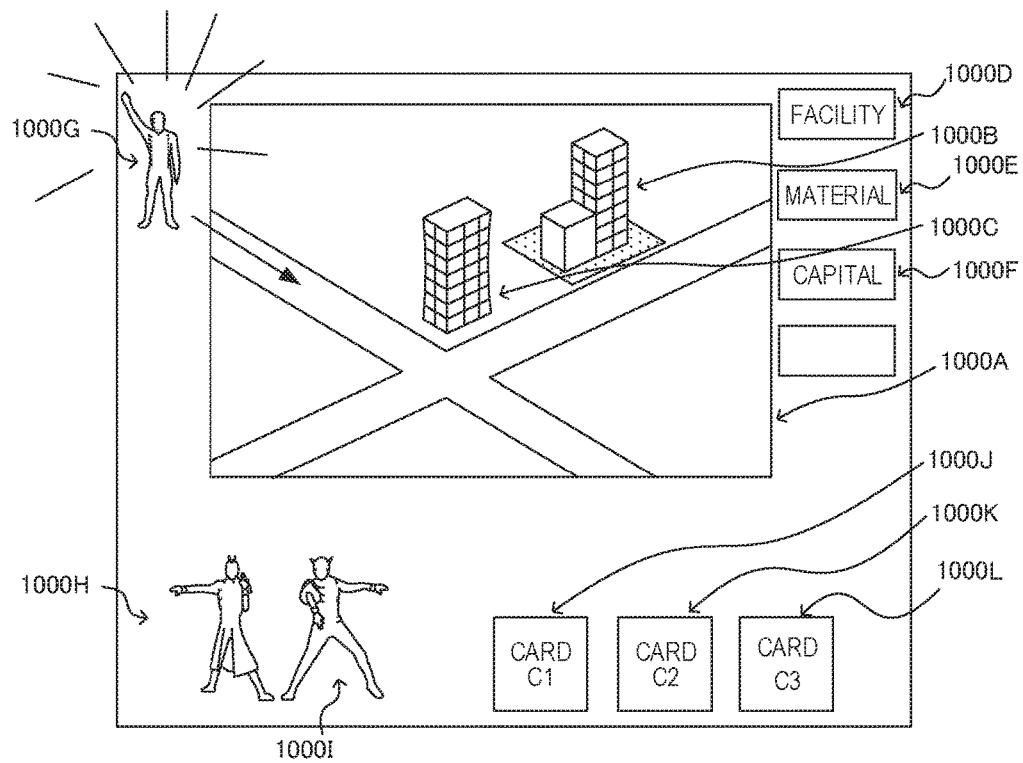
FIG. 6 is a diagram for illustrating the game screen (when an enemy character has appeared) of the city building game in one embodiment of the present invention.
Figure 7:
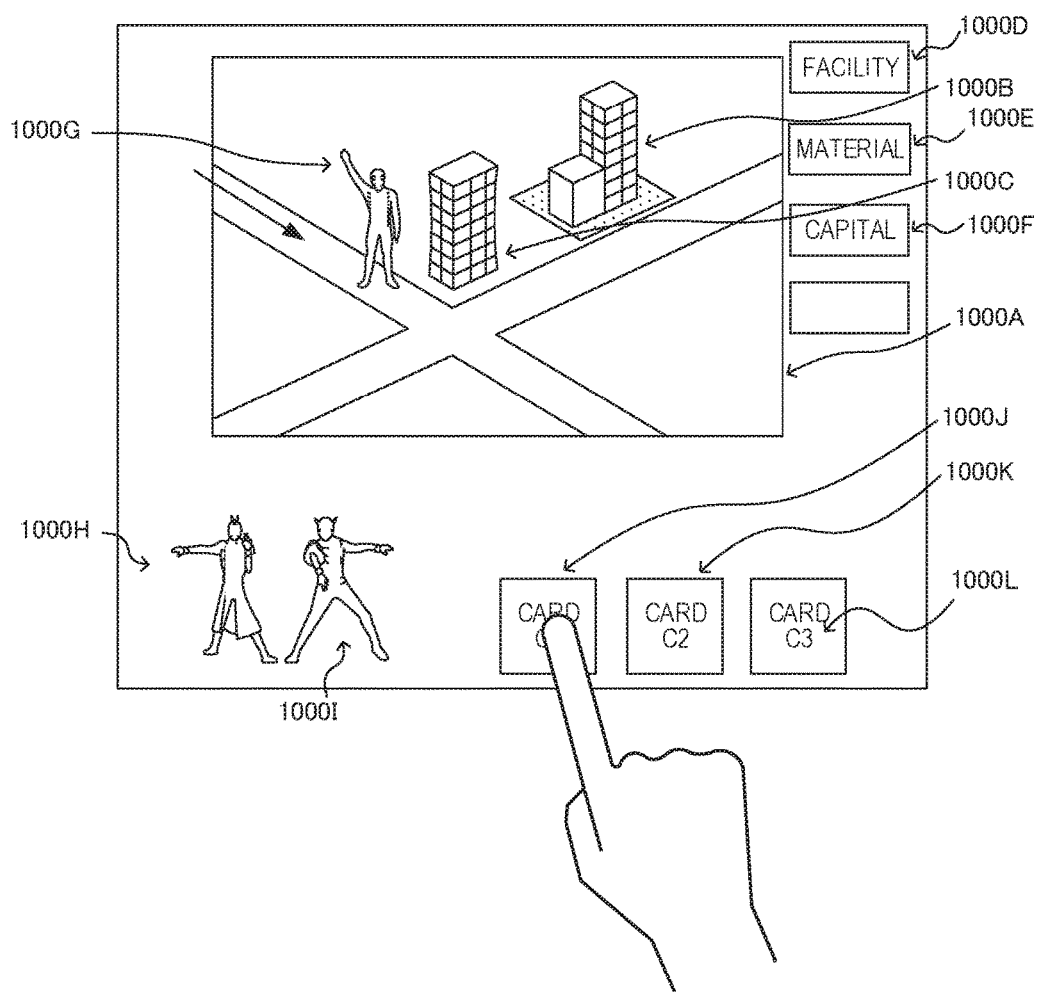
FIG. 7 is a diagram for illustrating the game screen (when selecting a card) of the city building game in one embodiment of the present invention.

At this time, the display control section 106 may attract the attention of the player by displaying the enemy character 1000G as illustrated in FIG. 6, for example, on the outer edge of the display area of the virtual space 1000A in the city building game screen. The display control section 106 may then create, as illustrated in FIG. 7, a moving image showing the enemy character 1000G invading toward the virtual space 1000A, and display that moving image on the city building game screen.

The first game processing section 104 then controls the movement of the enemy character 1000G that has invaded the virtual space 1000A based on automatic calculation processing. In FIG. 7, there is illustrated a case in which the enemy character 1000G moves closer toward the facility 1000C in the virtual space 1000A. The movement path is an area corresponding to the roads in the virtual space 1000A (area in which facility placement is prohibited).

4-2-3. Screen Relating to Player Character Introduction

Next, the player sets the player character to fight the enemy character 1000G in order to protect the facility 1000C from the enemy character 1000G.

At this time, the display control section 106 displays one or more player characters 1000H and 1000I owned by the player and one or more cards 1000J and 1000K possessed by the player in a predetermined region of the city building game screen (refer to FIG. 5 and FIG. 6). The parameter relating to the cards possessed by the player is held in the user information 146, for example, of the storage section 140, and is managed by the game management section 103 (refer to FIG. 13, which is described later). Various cards can be used, including, for example, a player character equipment card, a card for increasing the physical strength of the player character, a card for increasing the combat strength of the player character, a card for lengthening the combat time of the player character, a card for changing the form of the player character, and a card for causing the player character to execute a special move. However, the following description focuses on an equipment card.

The player selects any one of the displayed cards 1000J, 1000K, or 1000L and any one of the displayed player characters 1000H or 1000I, and sets the selected card in the selected character.

Figure 8:
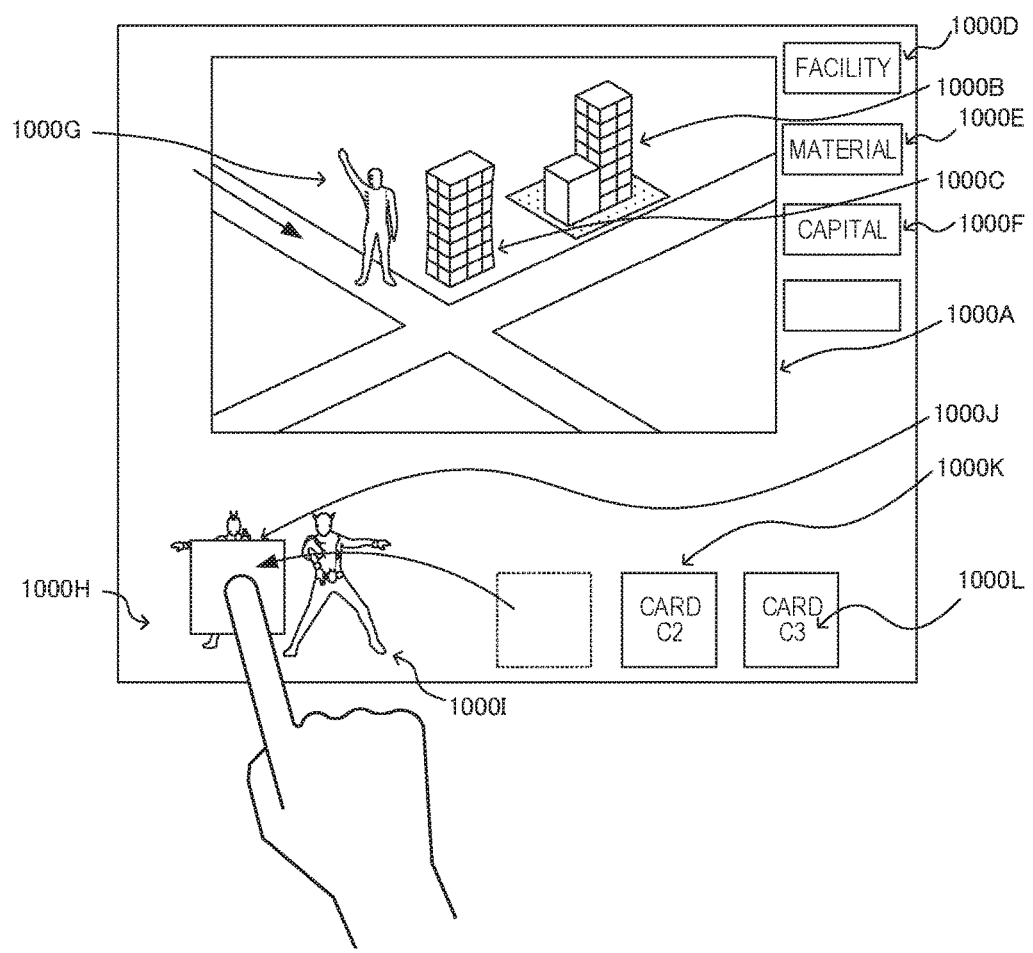
FIG. 8 is a diagram for illustrating the game screen (when setting a card) of the city building game in one embodiment of the present invention.

For example, the player can set the relevant card in the player character by touching one card, and dragging and dropping that card onto one player character. In FIG. 7 and FIG. 8, there is illustrated a case in which the card 1000J has been touched, and dragged and dropped onto the player character 1000H.

The player character 1000H has an upper limit of the number of cards (number of slots) that can be set. Therefore, the player can repeat setting a card in the player character 1000H until the number of set cards reaches the upper limit of the number of slots. As a result, the equipping of the player character 1000H is complete. The display control section 106 may change the appearance of the player character 1000H before and after card setting so that the player can recognize whether or not cards have been set (an illustration of changes in the appearance is omitted).

The parameters (e.g., character attribute, level, and number of slots) relating to the player characters 1000H and 1000I owned by the player and the parameters (e.g., card attribute and card strength) relating to the cards 1000J, 1000K, and 1000L possessed by the player are held in the user information 146, and managed by the game management section 103 (refer to FIG. 13). Parameters such as the identification number of each of the cards currently set in the player character 1000H are also held in the user information 146, and managed by the game management section 103 (not shown in FIG. 13).

Figure 9:
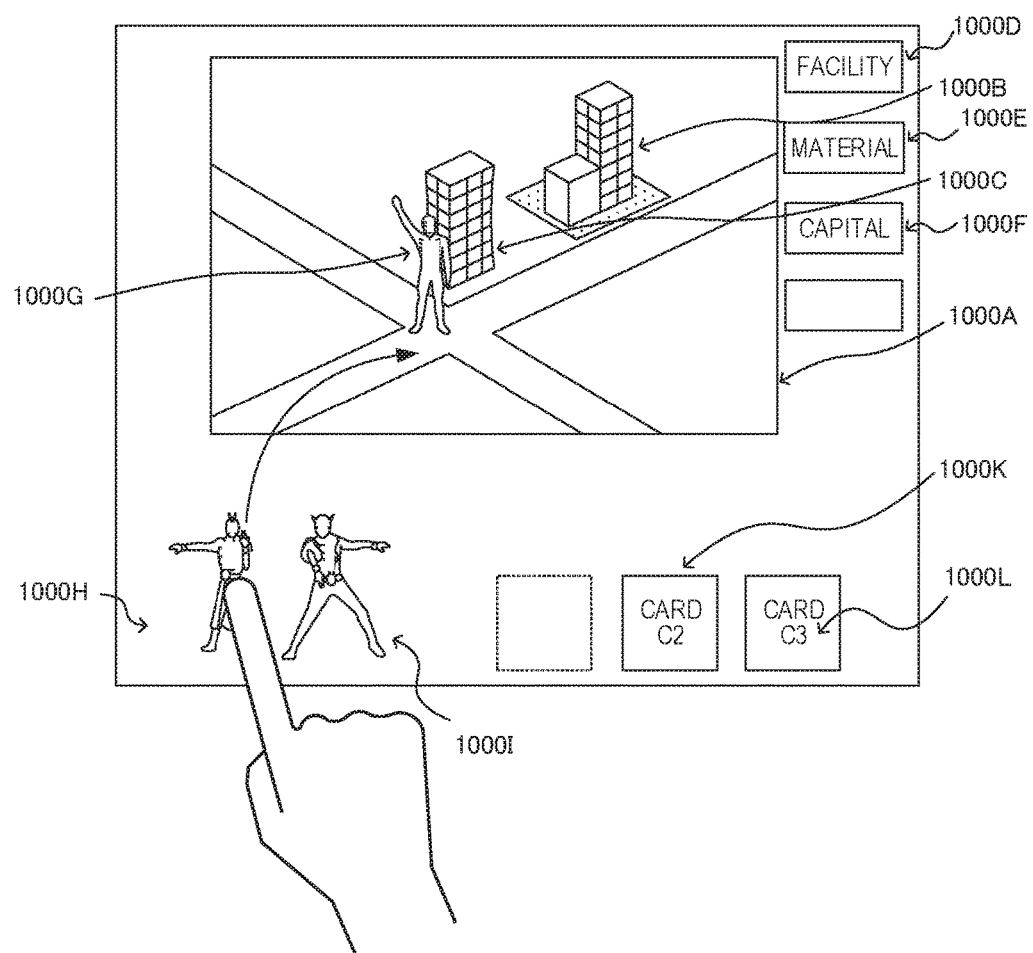
FIG. 9 is a diagram for illustrating the game screen (when introducing a player character) of the city building game in one embodiment of the present invention.

Next, the player introduces the player character 1000H, which has finished being equipped, into the virtual space 1000A as illustrated in FIG. 9, for example. For example, the player can introduce the player character 1000H into the virtual space 1000A by touching the player character 1000H, and dragging and dropping the player character 1000H onto a desired area of the virtual space 1000A.

Figure 10:
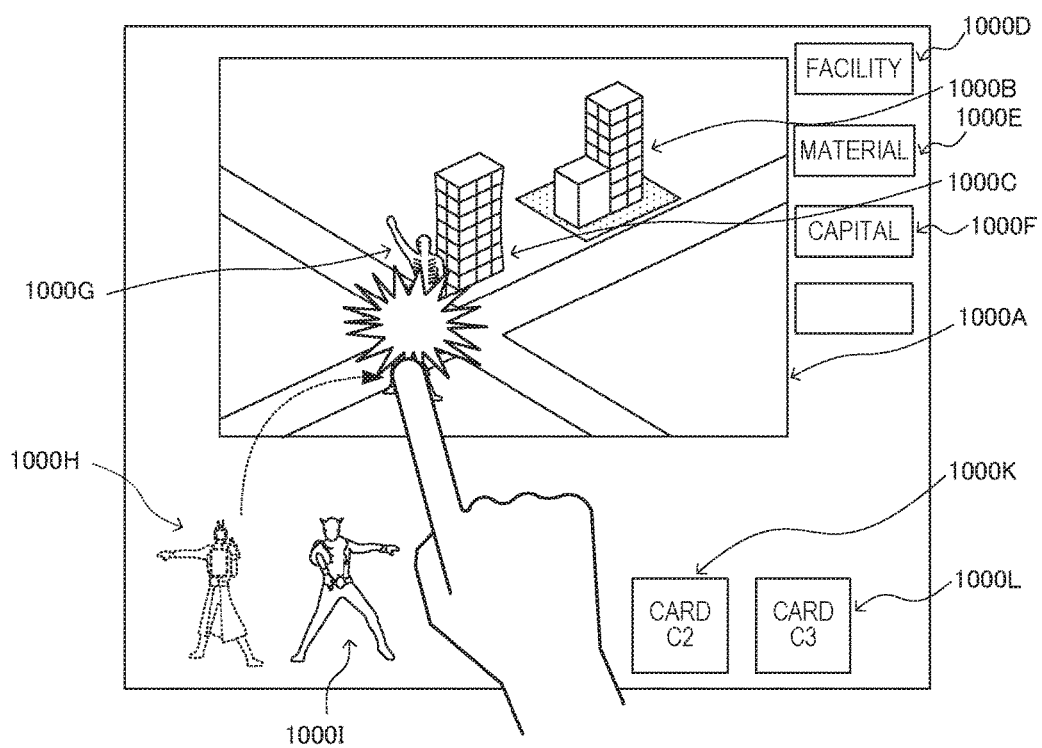
FIG. 10 is a diagram for illustrating the game screen (when a battle start condition has been established) of the city building game in one embodiment of the present invention.

The first game processing section 104 controls movement of the player character 1000H introduced into the virtual space 1000A based on automatic calculation processing. In FIG. 10, there is illustrated an example of a case in which the player character 1000H has moved toward and collided with the enemy character 1000G.

At this time, the game management section 103 executes processing for judging whether or not the enemy character 1000G and the player character 1000H have satisfied a given condition (e.g., distance becoming less than given threshold) in the virtual space 1000A (whether or not the condition is established). When it is judged that the condition is established, the game management section 103 causes the second game processing section 105 to start execution of the battle game. More specifically, the second game processing section 105 executes a battle game causing the enemy character and the player character that have satisfied the given condition (e.g., distance becoming less than given threshold) to fight (refer to upper right blocks in FIG. 3 and FIG. 4).

The second game processing section 105 may set the number of enemy characters simultaneously appearing in the virtual space 1000A to be two or more. In this case, the game management section 103 may judge whether or not a plurality of combinations of enemy characters and player characters capable of fighting each other are simultaneously present in the virtual space 1000A. When it is judged that a plurality of combinations of enemy characters and player characters capable of fighting each other are simultaneously present in the virtual space 1000A, the game management section 103 may determine a battle order of the plurality of combinations based on a given criterion. The second game processing section 105 executes the battle game in the order designated by the game management section 103.

The given criterion is, for example, a criterion such as "cause battle to start in order from combination satisfying given condition (e.g., distance becoming less than given threshold)". As a result, the player can fight a plurality of enemy characters in order by using a plurality of player characters.

When it is judged that a plurality of combinations of enemy characters and player characters capable of fighting each other are simultaneously present in the virtual space 1000A, the game management section 103 may set a battle order of the plurality of combinations in a user-designated order. In this case, for example, the player designates an introduction order of the plurality of player characters into the virtual space 1000A, and an opponent of each player character. As a result, the player can fight a plurality of enemy characters in order by using a plurality of player characters. The player can also set the order of those battles to a desired order.

The designation of the order by the player can also be performed in the following manner, for example. Specifically, first, the game management section 103 executes judgment processing on each of the plurality of player characters introduced into the virtual space 1000A by the player. This judgment processing is processing for judging which enemy character satisfies the given condition (i.e., distance becoming less than given threshold). However, even when it is judged that the given condition has been established for one of the player characters, the game management section 103 does not immediately start the battle of that player character, and waits before starting the battle (i.e., a state is maintained in which the player character and the enemy character are confronting each other). When the given condition has been established for a plurality of player characters, the player touches the plurality of player characters in a desired order. When the touch operation has been performed for all of the plurality of player characters, the game management section 103 quickly starts the battle in order of the touched player characters.

4-2-4. Switch to Battle Game Screen

When it is judged that the given condition (i.e., distance becoming less than given threshold) has been established in the virtual space 1000A, the display control section 106 executes processing for switching the display screen of the display section 290 from the city building game screen (FIG. 10) to the battle game screen (FIG. 11) relating to the battle game. In this case, the psychological state of the player can be immediately and forcibly moved from a stable psychological state of "enjoying development and the like" to a tense psychological state of "going into battle".

During this switching, the display control section 106 may execute processing for causing a dramatic image or moving image for expressing the start of the battle to be displayed on the display screen.

Figure 11:
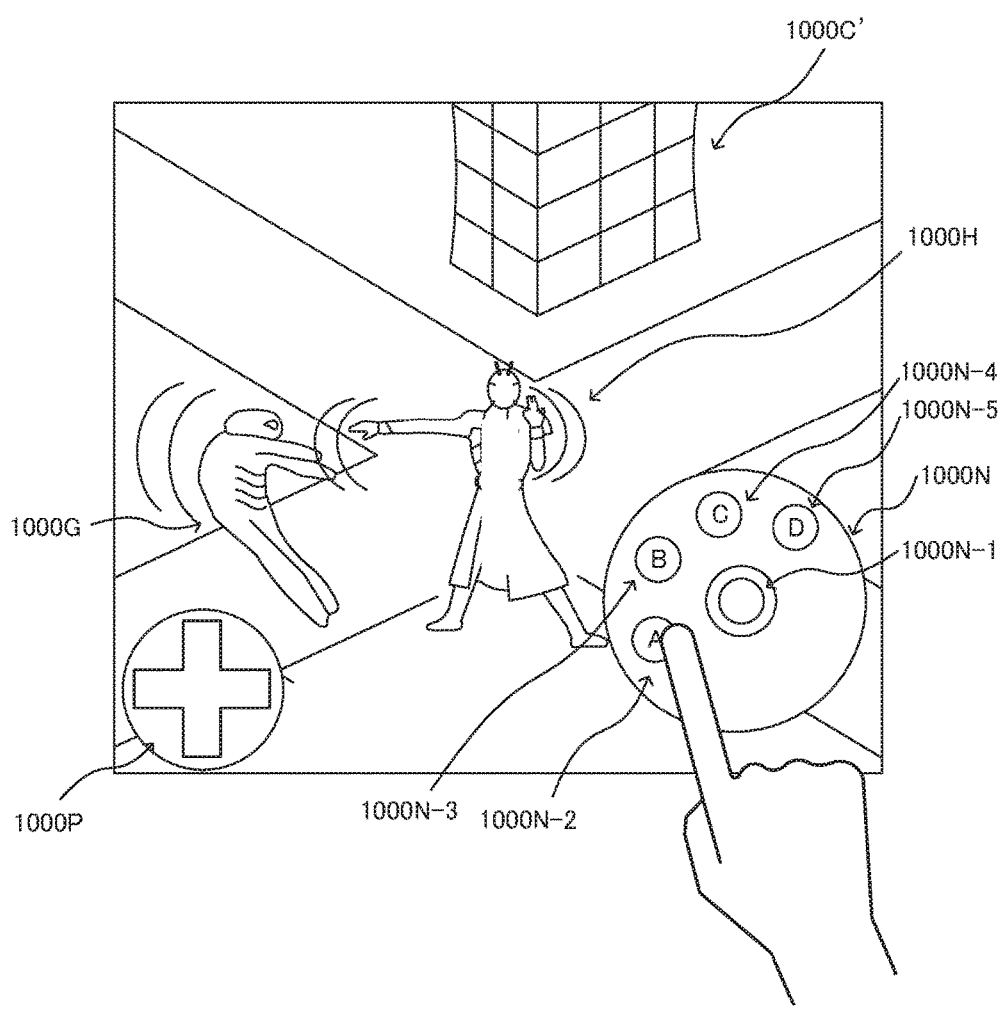
FIG. 11 is a diagram for illustrating the game screen of the battle game in one embodiment of the present invention.

The player character 1000H and the enemy character 1000G are placed on the battle game screen (FIG. 11). The combat actions of the player character 1000H are controlled based on operations by the player, and the combat actions of the enemy character 1000G are controlled by the second game processing section 105.

The processing section 100 further includes an input reception section which starts, when it is judged that the given condition (i.e., distance becoming less than given threshold) has been established, reception processing for receiving operation input relating to the battle game by the player. In this case, the player is permitted to perform operations in the battle game as a result of the switch in screens, and hence a player who started operations at a good timing can be provided with an advantage in the battle. Therefore, according to this embodiment, the player's sense of tension when an enemy character appears can be boosted.

The display control section 106 executes the following processing (a), (b), (c), and (d) when causing the display section 290 to display the battle game screen (FIG. 11).

(a) Processing for specifying the area relating to the battle in the virtual space 1000A.

(b) Processing for specifying the facility (in FIG. 10, the facility 1000C) present in the area relating to the battle in the virtual space 1000A.

(c) Processing for generating an image 1000C' of at least a part of the facility 1000C.

(d) Control processing for causing the display section 290 to display the image 1000C' as a background of the battle game screen (FIG. 11).

In this case, the player can be provided with a sense that the battle in the battle game is being performed in the virtual space 1000A of the city building game based on a simple image generation technology.

The display control section 106 further executes the following processing (e), (f), and (g) when causing the display section 290 to display the battle game screen (FIG. 11).

(e) Processing for setting a virtual camera in the area relating to the battle in the virtual space 1000A.

(f) Processing for generating an image of the virtual space viewed from the virtual camera.

(g) Control processing for causing the display section 290 to display the image as a background of the battle game screen (FIG. 11).

In this case, the player can reliably be provided with a sense that the battle in the battle game is being performed in the virtual space of the city building game.

When it is judged that the given condition (i.e., distance becoming less than given threshold) has been established, the display control section 106 starts the display of images 1000N and 1000P for operation input relating to the battle game. Therefore, as a result of the start of the display of the images 1000N and 1000P for operation input, the player can recognize that he or she is permitted to perform operations in the battle game.

4-2-5. Battle Game Screen

The images 1000N and 1000P for operation input arranged in the battle game screen are so-called virtual controllers. The image 1000N for operation input includes, for example, an attack button 1000N-1 for controlling the attack of the player character 1000H, and skill slots 1000N-2, 1000N-3, 1000N-4, and 1000N-5. The image 1000P for operation input is, for example, a directional pad (D-pad) for controlling the movement of the player character 1000H.

The skill slots 1000N-2, 1000N-3, 1000N-4, and 1000N-5 each represent a piece of equipment (in this example, a card) that has been set in the player character 1000H. Based on the combination of pieces of equipment, the variation of the attack actions (skills) of the player character 1000H changes. Therefore, the player can customize the player character 10000H based on the set cards in the player character 1000H. The cards that are set in the skill slots 1000N-2, 1000N-3, 1000N-4, and 1000N-5 can be replaced by the player during the battle.

In the battle game, the player operates the combat actions of the player character 1000H by tapping with his or her fingers the images 1000N and 1000P for operation input. For example, when any of the skill slots 1000N-2, 1000N-3, 1000N-4, and 100N-5 is touched by the player, the second game processing section 105 causes the player character 1000H to perform an attack action (or a defense action) corresponding to the card set in the touched skill slot.

However, the second game processing section 105 controls the effect of the attack, the effect of the defense, and the like of the player character 1000H based on the parameters (e.g., level) of the player character 1000H held in the user information 146. Further, the second game processing section 105 controls the combat actions of the enemy character 1000G based on parameters (e.g., level and attribute) prepared in advance for the enemy character 1000G Any known method may be employed for the method of controlling the action tendencies of the characters based on the level, attributes, and the like of the characters.

During the battle game, the game management section 103 causes a physical strength value (hit-point (HP) value) of the player character 1000H and the physical strength value (HP value) of the enemy character 1000G to increase or decrease (causes the player character 1000H and the enemy character 1000G to compete with each other for the physical strength HP) in accordance with the combat actions (i.e., attack actions and defense actions) of the player character 1000H and the combat actions (i.e., attack actions and defense actions) of the enemy character 1000G.

4-2-6. Switch to City Building Game Screen

The game management section 103 judges whether or not a given condition (e.g., the physical strength HP score of one of the characters becoming zero) has been established, and, when it is judged that the predetermined condition has been established, causes the second game processing section 105 to end the battle game.

The first game processing section 104 may allow the city building game to progress or halt the city building game during the period from the start until the end of the battle game. However, even when the city building game is allowed to progress, the processing section 100 prohibits reception of operation input relating to the city building game during execution of the battle game. Therefore, the city building game does not progress dramatically during at least execution of the battle game.

When it is judged that a given condition (e.g., the physical strength HP score of one of the characters becoming zero, or elapse of a predetermined duration) has been established, the display control section 106 executes processing for switching the display screen of the display section 290 from the battle game screen (FIG. 11) to the city building game screen (FIG. 5). In this case, the psychological state of the player can be immediately and forcibly moved from a tense psychological state of "going into battle" to a stable psychological state of "enjoying development and the like".

During this switching, the display control section 106 may execute processing for causing a dramatic image or moving image for expressing the result of the battle to be displayed on the display screen.

The display control section 106 ends the display of the images 1000N and 1000P for operation input relating to the battle game when it is judged that a given condition (e.g., the physical strength HP score of one of the characters becoming zero, or elapse of a predetermined duration) has been established (i.e., when it is judged that the battle has ended). Therefore, as a result of the end of the display of the images 1000N and 1000P for operation input, the player can recognize operations in the battle game have been prohibited.

4-3. Description of Main Parameters in City Building Game

The parameters used in the city building game are now described with reference to FIG. 12. The parameters used in the city building game are not limited to the parameters described here, and it is not necessarily the case that all of the parameters described here are essential.

The parameters are stored in the user information 146, and are added to, deleted, or updated as appropriate by the game management section 103 during execution of the city building game or execution of the battle game.

As shown in FIG. 12, the parameters used in the city building game include a parameter for each facility and a parameter indicating an overall progress situation (level) in the city building game.

The parameter for each facility is a parameter for each of the one or more facilities that have been placed in the virtual space by the player. In FIG. 12, there is shown an example in which the number of facilities is three or more.

The parameter for each facility includes individual parameters regarding the identification number of the facility, an attribute of the facility (facility attribute), position coordinates in the virtual space, a progress situation (level) of the facility, and an enemy character occupation situation. In the example of FIG. 12, the progress situation (level) of the facility is represented as one of three levels, namely, "LV1", "LV2", or "LV3".

The parameter regarding an enemy character occupation situation includes an occupation flag indicating whether or not the relevant facility is occupied by an enemy character and the identification number of that enemy character.

The parameter indicating the overall progress situation (level) of the city building game is set to be a higher value when the number of facilities placed in the virtual space is higher. This parameter is also set to a higher value when the progress situation (level) of each of the facilities is higher. In FIG. 12, there is shown an example in which the overall progress situation (level) of the city building game is "LV1".

4-4. Description of Main Parameters in Battle Game

The parameters used in the battle game are now described with reference to FIG. 13. The parameters used in the battle game are not limited to the parameters described here, and it is not necessarily the case that all of the parameters described here are essential.

The parameters are stored in the user information 146, and are added to, deleted, or updated as appropriate by the game management section 103 during execution of the city building game or execution of the battle game.

As shown in FIG. 13, the parameters used in the battle game include a parameter for each player character and a parameter for each card.

The parameter for each player character is a parameter for each of the one or more player characters owned by the player. In FIG. 13, there is shown an example in which the number of player characters is three or more.

The parameter for each player character includes individual parameters regarding the identification number of the player character, an attribute of the player character (character attribute), the level of the player character, and the number of slots of the player character (number of cards that can be set in the player character).

The parameter for each card is a parameter for each of the one or more cards possessed by the player. In FIG. 13, there is shown an example in which the number of cards is three or more.

The parameter for each card includes individual parameters regarding the identification number of the card, an attribute of the card (card attribute), and the strength (level) of the card.

4-5. Link Between City Building Game and Battle Game 4-5-1. Level Control of Enemy Character The game management section 103 may determine the enemy character to be caused to appear in the virtual space 1000A based on the parameter indicating the progress situation of the city building game.

For example, during the period in which the battle game is not being executed, the game management section 103 monitors, of the parameters of the city building game (FIG. 12), the parameter indicating the overall progress situation (level), and judges whether that parameter belongs to a low level, a medium level, or a high level.

When it is judged that the parameter of the city building game belongs to a high level, the game management section 103 then issues an instruction to the second game processing section 105 to select the enemy character to be caused to appear in the virtual space 1000A from among enemy characters having a high level.

Further, when it is judged that the parameter of the city building game belongs to a medium level, the game management section 103 issues an instruction to the second game processing section 105 to select the enemy character to be caused to appear in the virtual space 1000A from among enemy characters having a medium level.

Further, when it is judged that the parameter of the city building game belongs to a low level, the game management section 103 issues an instruction to the second game processing section 105 to select the enemy character to be caused to appear in the virtual space 1000A from among enemy characters having a low level.

In this case, the second game processing section 105 increases the strength of the opponent in the battle game as the city building game progresses (i.e., as the virtual space 1000A is developed, for example). Therefore, the player can be provided with a strong sense that the city building game and the battle game are linked.

The relation among the "high level", the "medium level", and the "low level" is relative, and may be any relation as long as the medium level is set to be lower than the high level and the low level is set to be lower than the medium level.

4-5-2. Enemy Character Appearance Frequency Control

The game management section 103 may set the appearance frequency of the enemy character in the virtual space 1000A based on the parameter indicating the progress situation of the city building game.

For example, during the period in which the battle game is not being executed, the game management section 103 monitors, of the parameters of the city building game (FIG. 12), the parameter indicating the overall progress situation (level), and judges whether that parameter belongs to a low level, a medium level, or a high level.

During a period in which it is judged that the parameter of the city building game belongs to a high level, the game management section 103 issues an instruction to the second game processing section 105 to set the appearance frequency of the enemy character in the virtual space 1000A to a high frequency.

Further, during a period in which it is judged that the parameter of the city building game belongs to a medium level, the game management section 103 issues an instruction to the second game processing section 105 to set the appearance frequency of the enemy character in the virtual space 1000A to a medium frequency.

Further, during a period in which it is judged that the parameter of the city building game belongs to a low level, the game management section 103 issues an instruction to the second game processing section 105 to set the appearance frequency of the enemy character in the virtual space 1000A to a low frequency.

In this case, the second game processing section 105 increases the frequency of execution of the battle game as the city building game progresses (i.e., as the virtual space 1000A is developed, for example). Therefore, the player can be provided with a strong sense that "the city building game and the battle game are linked".

The relation among the "high level", the "medium level", and the "low level" is relative, and may be any relation as long as the medium level is set to be lower than the high level and the low level is set to be lower than the medium level. The relation among the "high frequency", the "medium frequency", and the "low frequency" levels is relative, and may be any relation as long as the medium frequency is set to be lower than the high frequency and the low frequency is set to be lower than the medium frequency.

4-5-3. Enemy Character Selection

The game management section 103 may determine the enemy character to be caused to appear in the virtual space 1000A in accordance with the player characters capable of being introduced into the virtual space 1000A by the player.

For example, during the period in which the battle game is not being executed, the game management section 103 monitors, of the parameters of the battle game (FIG. 13), the character attribute and the level of each of the one or more player characters owned by the player. The game management section 103 then judges whether the most common character attribute is an attribute A, an attribute B, or an attribute C (this example is based on the assumption that there are three character attributes, namely, the attributes A, B, and C). The game management section 103 then judges whether the overall level of the one or more player characters belongs to the low level, the medium level, or the high level (this example is based on the assumption that the overall level is classified into three levels, namely, the low level, the medium level, and the high level).

When it is judged that the character attribute is the attribute A, the game management section 103 then issues an instruction to the second game processing section 105 to select the enemy character to be caused to appear in the virtual space 1000A from among the enemy characters having a character attribute A' corresponding to the character attribute A.

Further, when it is judged that the character attribute is the attribute B, the game management section 103 issues an instruction to the second game processing section 105 to select the enemy character to be caused to appear in the virtual space 1000A from among the enemy characters having a character attribute B' corresponding to the character attribute B.

Further, when it is judged that the character attribute is the attribute C, the game management section 103 issues an instruction to the second game processing section 105 to select the enemy character to be caused to appear in the virtual space 1000A from among the enemy characters having a character attribute C' corresponding to the character attribute C.

Further, when it is judged that the level is a low level, the game management section 103 issues an instruction to the second game processing section 105 to select the enemy character to be caused to appear in the virtual space 1000A from among the enemy characters having a low level.

Further, when it is judged that the level is a medium level, the game management section 103 issues an instruction to the second game processing section 105 to select the enemy character to be caused to appear in the virtual space 1000A from among the enemy characters having a medium level.

Further, when it is judged that the level is a high level, the game management section 103 issues an instruction to the second game processing section 105 to select the enemy character to be caused to appear in the virtual space 1000A from among the enemy characters having a high level.

In this case, the second game processing section 105 changes the attribute and level combination of the enemy character as the attribute and level combination of the player characters capable of being introduced into the virtual space 1000A changes.

4-5-4. Win-Based Acceleration of City Building

The game management section 103 may execute, when it is judged that the player character won the battle, processing for changing a parameter of the city building game in a direction that accelerates progress in the city building game.

For example, during execution of the battle game, the game management section 103 judges whether or not the player character won (or whether the enemy character won). When it is judged that the player character won, the game management section 103 then issues an instruction to the first game processing section 104 to increase, among the parameters of the city building game (FIG. 12), the parameter indicating the progress situation (level) of one or more facilities. The first game processing section 104 executes at least one of:

(a) acceleration processing for automatically increasing the supply of capital, material, resources, people, and the like;

(b) acceleration processing for automatically increasing the progress situation (level) of a facility;

(c) acceleration processing for increasing the gain in the progress situation (level) with respect to the supply amount; and (d) acceleration processing for increasing the rate of increase.

In this case, the first game processing section 104 accelerates (i.e., increases the rate of progress) progress in the city building game when the player character wins in the battle game, and hence the player can be provided with a real sense that his or her own virtual space is being protected by the player character.

The game management section 103 may continue the acceleration processing during the period from the player character having been judged as winning the battle until the next time it is judged that the enemy character wins a battle.

In this case, the first game processing section 104 continues accelerating progress in the city building game during the period in which the player character continues to win in the battle game. As a result, the first game processing section 104 is capable of providing the player with a sense that "his or her own virtual space continues to be protected by the player character".

The display control section 106 may change the state of the city building game screen depending on whether or not the virtual space 1000A is being protected by the player character. For example, the display control section 106 may perform processing for improving the ambience of the city building game screen during the period in which the virtual space 1000A is being protected by the player character. Examples of the processing for improving the ambience include displaying an image of being protected by the player character superimposed on the virtual space 1000A, and increasing the colorfulness or brightness, for example, of at least a part of the city building game screen.

The game management section 103 may execute, in place of or in addition to the acceleration processing, processing for conferring to the player a portion of at least capital, material, resources, people, and the like.

4-5-5. Loss-Based Restriction of City Building

In contrast, the game management section 103 may execute, when it is judged that the enemy character won the battle, processing for changing a parameter of the city building game in a direction that restricts progress in the city building game.

For example, during execution of the battle game, the game management section 103 may judge whether or not the enemy character won (or whether the player character won). When it is judged that the enemy character won, the game management section 103 may then issue an instruction to the first game processing section 104 to prohibit increase in, among the parameters of the city building game (FIG. 12), the parameter indicating the progress situation (level) of one or more facilities for a predetermined period.

During the predetermined period, the first game processing section 104 executes, for example, at least one of the following restriction processing:

(a) restriction processing for prohibiting the supply of capital, material, resources, people, and the like;

(b) restriction processing for prohibiting increase in the progress situation (level) of a facility;

(c) restriction processing for decreasing the gain in the progress situation (level) with respect to the supply amount; and (d) restriction processing for decreasing the rate of increase.

In this case, the first game processing section 104 restricts progress (i.e., decreases the rate of progress) in the city building game until the player character wins in the battle game. As a result, the first game processing section 104 is capable of providing the player with a real sense that "his or her own virtual space continues to be protected by the player character".

The game management section 103 may continue this restriction during the period from the enemy character having been judged as winning the battle until the next time it is judged that the player character wins a battle.

In this case, unless the player character wins in the battle game, the first game processing section 104 continues restricting progress in the city building game until the player character next wins a battle. As a result, the first game processing section 104 is capable of providing the player with a sense that "his or her own virtual space continues to be occupied (controlled) by the enemy character".

The display control section 106 may change the state of the city building game screen depending on whether or not the virtual space 1000A is occupied by the enemy character. For example, the display control section 106 may perform processing for highlighting the city building game screen during the period in which the virtual space 1000A is occupied by the enemy character. Examples of the highlighting processing include displaying an image of being occupied by the enemy character superimposed on the virtual space 1000A, reducing the colorfulness or brightness, for example, of at least a part of the city building game screen, and causing the brightness of at least a part of the city building game screen to blink on and off.

The game management section 103 may execute, in place of or in addition to the restriction processing, processing for depriving the player of a portion of at least capital, material, resources, people, and the like.

4-5-6. Facility Occupation

The game management section 103 may also include, in the virtual space 1000A:

specification means for specifying an area relating to a battle, and specifying a given facility present in the area relating to the battle;

association means for judging whether or not an enemy character won the battle, and when it is judged that the enemy character won the battle, storing in the storage section 140 information for associating the facility and the enemy character;

association release means for judging whether or not a player character won the next battle relating to the facility, and when it is judged that the player character won, releasing the association;

restriction means for performing restriction on at least the facility relating to the association; and restriction release means for releasing the restriction when the association of the facility has been released.

For example, when a plurality of facilities are present in the area relating to the battle, the game management section 103 specifies a facility having the highest progress situation (level), a facility having a specific attribute (e.g., a factory), or the like as the given facility. The game management section 103 turns on, when it is judged that the enemy character won, among the parameters of the city building game (FIG. 12) in the user information 146, the occupation flag of the facility. The game management section 103 also associates and records the identification number of the enemy character with that facility. This association represents the state in which the facility has been occupied by the enemy character.

After that, when the player character wins against the same enemy character in the next battle in the area, the game management section 103 turns off, among the parameters of the city building game (FIG. 12) in the user information 146, the occupation flag of the facility, and deletes the identification number of the enemy character associated with that facility. As a result, the association is released. This release represents the fact that the occupied state of the facility has ended.

Meanwhile, the game management section 103 monitors the parameters of the city building game (FIG. 12), and judges whether or not there are any facilities having an occupation flag set to ON. When a facility having an occupation flag set to ON is detected, the game management section 103 issues an instruction to the first game processing section 104 to restrict the supply of capital, material, resources, people, and the like to that facility. More specifically, the game management section 103 executes restriction processing regarding a facility that is occupied by an enemy character.

Further, the game management section 103 monitors the parameters of the city building game (FIG. 12), and judges whether or not there are any facilities having an occupation flag set to ON. When a facility having an occupation flag set to ON is not detected, the game management section 103 does not prohibit (control) the supply of capital, material, resources, people, and the like to any facilities. More specifically, the game management section 103 does not execute restriction processing regarding a facility that is not occupied by an enemy character.

Therefore, the player can be provided with a sense of occupation by the enemy character for each facility.

The display control section 106 may change the appearance of a facility occupied by an enemy character. For example, the display control section 106 may perform processing for highlighting the facility. Examples of the highlighting processing include displaying an image of the facility being occupied by the enemy character superimposed on the city building game screen, reducing the colorfulness or brightness, for example, of at least a part of the image of the facility, and causing the brightness of the facility to blink on and off.

4-5-7. Strengthening of Player Character

The game management section 103 may execute, when a special item (which is an example of a specific object) appearing in the virtual space 1000A has been acquired by the player, processing for changing a parameter relating to the combat strength of the player character.

In this case, the special item is one or more items appearing in the virtual space 1000A when a predetermined condition has been satisfied by progress in the city building game. Examples of the parameter relating to the combat strength of the player character include the player character per se that can be introduced into the virtual space 1000A, the level (combat strength) of the player character, an item with which the player character can be equipped, an upper limit of the level (combat strength) of the player character, and the number of slots of the player character.

For example, during execution of the city building game, the game management section 103 judges whether or not a special facility relating to the player character owned by the player has been completed (i.e., whether or not the progress situation of the special facility has reached a high level). The game management section 103 then confers the special item to the player when it is judged that the special facility has been completed. Conferral of the special item to the player can also be performed by additionally registering the special item in the parameters of the battle game (FIG. 13) (a special item parameter is not shown in FIG. 13).

The game management section 103 monitors the parameters of the city building game in the user information 146 (FIG. 12), and judges whether or not the number of special items possessed by the player has reached a predetermined number. When it is judged that the number of special items has reached the predetermined number, the game management section 103 executes processing for updating at least one of the parameters of the battle game (FIG. 13). Several specific examples of the update processing are now described.

(1) Conferral of Player Character

The game management section 103 confers a new player character to the player. The conferral of the player character to the player can be performed by registering a new player character in the parameters of the battle game (FIG. 13).

(2) Raising Level of Player Character

The game management section 103 performs processing for raising the level of a player character owned by the player. The processing for raising the level is performed by updating, among the parameters of the battle game (FIG. 13), the parameter corresponding to the level of the player character.

(3) Conferral of Card

The game management section 103 confers a new card to the player. The conferral of the card to the player can be performed by registering a new card in the parameters of the battle game (FIG. 13).

(4) Releasing Level Upper Limit

The game management section 103 releases the upper limit of the level (combat strength) of a player character owned by the player. The processing for releasing the upper limit is performed by lifting (or releasing), among the parameters of the battle game (FIG. 13), the upper limit (not shown) imposed on the level of the player character.

(5) Increasing Number of Slots

The game management section 103 increases the number of slots of a player character owned by the player. The processing for increasing the number of slots is performed by updating, among the parameters of the battle game (FIG. 13), the number of slots of the player character.

(6) Releasing Upper Limit of Number of Slots

The game management section 103 releases the upper limit of the number of slots of a player character owned by the player. The processing for releasing the upper limit is performed by lifting or releasing, among the parameters of the battle game (FIG. 13), the upper limit (not shown) imposed on the number of slots of the player character.

(7) Other

When the player can synthesize a card capable of being set in the player character based on card synthesis, the upper limit of card strengthening by card synthesis can be lifted (or released).

Therefore, when the player plays the city building game, the game management section 103 is capable of providing the player with a sense that he or she is "participating in the battle game". Specifically, the combat strength of the player character can be increased by a special item that appears in the virtual space 1000A only when the city building game has progressed to a certain level or further, and hence the player can be provided with a real sense that "progress in the city building game works in a beneficial manner for the battle game".

4-6. Linking with Another Player

The game management section 103 may execute processing for causing the player character of another player having a given relation with the player to participate in the battle on the player character side, and to confer to the another player a special advantage in accordance with at least one of a result of the battle and a parameter indicating the progress situation of the city building game.

For example, during the period after the appearance of the enemy character in the virtual space 1000A of the player but before the battle has started, the game management section 103 issues a call for one or more other players to participate in (i.e., help with) the battle by transmitting a message to the terminal device of those other players. At this time, the game management section 103 may transmit, together with a message, at least a part of the game image of the game being played by the player to the terminal devices of those other players.

Identification information on another player having a relation with the player is written in advance in the user information 146, for example. The game management section 103 is capable of specifying the terminal device 20 of the other player based on that information. The game management section 103 may restrict the transmission destination of the message to another player who is logged in to the same game. The game management section 103 may lengthen the period for transmitting the message in order to enable another player to participate midway through the battle.

When another player is detected as having expressed participation in response to the call before the battle has started or during the battle, the game management section 103 instructs the second game processing section 105 to execute the battle game in a collaborative play mode between the player and the another player.

In the collaborative play mode, the player operates one of the player characters that are owned by the player, and the another player operates one of the player characters that are owned by the other player. In the collaborative play mode, the player character operated by the player, the player character operated by the another player, and the enemy character controlled by the second game processing section 105 are shown in the battle game image displayed on the terminal device of the player. Similarly, in the collaborative play mode, the player character operated by the player, the player character operated by the another player, and the enemy character controlled by the second game processing section 105 are shown in the battle game image displayed on the terminal device of the another player. The processing performed by the second game processing section 105 and the processing performed by the display control section 106 specific to the collaborative play mode are known, and hence a detailed description of such processing is omitted here.

When the battle based on collaborative play has ended, the game management section 103 judges whether or not the player character side won. When it is judged that the player character side won, the game management section 103 executes processing for conferring to the another player a special advantage (e.g., a card that can be set by the player) that has a higher value when the progress situation (level) of the city building game is higher. On the other hand, the game management section 103 does not confer the special advantage to the other player when the player character side lost. Conferral of the special advantage to the other player can be performed by additionally registering the special advantage in a parameter of the battle game relating to the other player (i.e., storing the special advantage in storage section 140 as user information on another player).

Therefore, the game management section 103 links the result of the battle game and the progress situation of the city building game with the advantage for the other player. As a result, the game management section 103 is capable of drawing the attention of the other player to at least one of the city building game and the battle game. Specifically, the special advantage is conferred to the other player only when the player character side wins, and hence the game management section 103 is capable of strongly attracting another player who has confidence in his or her ability to participate in the battle. Further, the value of the special advantage conferred to the another player is higher when there has been more progress in the city building game, and hence the game management section 103 is also capable of drawing the attention of the another player to the progress situation of the city building game by the player. Besides, the other player can be more strongly attracted to the battle game when there has been more progress in the city building game.

4-7. Flow

Several flows in the present invention are now described. However, the flows described below do not represent all of the series of processing procedures described above, but the flows represent portions extracted from the series of processing procedures described above (in particular, portions having a temporal characteristic).

4-7-1. Screen Switching Processing Flow

Figure 14:
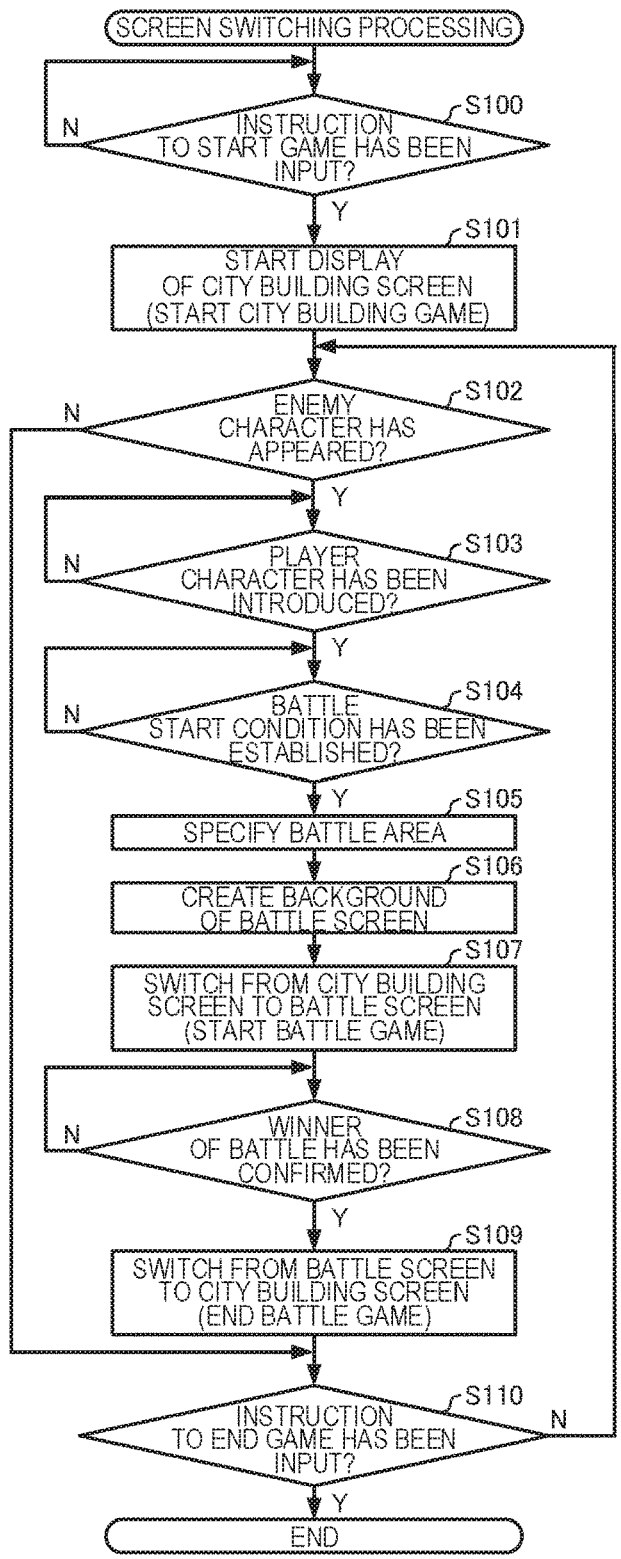
FIG. 14 is a flowchart of screen switching processing.

A flow of screen switching processing performed by the game management section 103 is now described with reference to FIG. 14.

First, the game management section 103 judges whether or not the player has input an instruction to start the game (S100). When it is judged that a start instruction has been input (S100: Y), the game management section 103 advances the processing to the next processing. When it is judged that a start instruction has not been input (S100: N), the game management section 103 repeats the judgment processing (S100).

Next, the game management section 103 starts the city building game, and starts the display of the game screen of the city building game (S101).

Next, the game management section 103 judges whether or not an enemy character has appeared in the virtual space 1000A (S102). When it is judged that an enemy character has appeared (S102: Y), the game management section 103 advances the processing to the next judgment processing (S103). When it is judged that an enemy character has not appeared (S102: N), the game management section 103 advances the processing to the end judgment processing (S110).

Next, the game management section 103 judges whether or not a player character has been introduced into the virtual space 1000A (S103). When it is judged that a player character has been introduced (S103: Y), the game management section 103 advances the processing to the next judgment processing (S104). When it is judged that a player character has not been introduced (S103: N), the game management section 103 repeats the judgment processing (S103).

Next, the game management section 103 judges whether or not a condition for a battle to start has been established (S104). When it is judged that the condition has been established (S104: Y), the game management section 103 advances the processing to the next judgment processing (S105). When it is judged that the condition has not been established (S104: N), the game management section 103 repeats the judgment processing (S104).

Next, the game management section 103 executes processing for specifying the area relating to the battle (S105).

Next, the game management section 103 executes processing for creating a background of the battle game screen (S106).

Next, the game management section 103 starts execution of the battle game, and switches the display screen of the display section 290 from the game screen for the city building game to the game screen for the battle game (S107).

Next, the game management section 103 judges whether or not the winner of the battle game has been confirmed (S108). When it is judged that the winner of the battle game has been confirmed (S108: Y), the game management section 103 advances the processing to the next processing (S109). When it is judged that the winner of the battle game has not been confirmed (S108: N), the game management section 103 repeats the judgment processing (S108).

Next, the game management section 103 ends execution of the battle game, and switches the display screen of the display section 290 from the game screen for the battle game to the game screen for the city building game (S109).

Next, the game management section 103 judges whether or not the player has input an instruction to end the game (S110). When it is judged that an end instruction has been input (S110: Y), the game management section 103 ends the flow. When it is judged that an end instruction has not been input (S110: N), the game management section 103 returns the processing to Step S102.

In the flow described above, within the limits of possibility, the steps may be executed in a different order or omitted.

4-7-2. City Building Parameter Control Processing Flow

Figure 15:
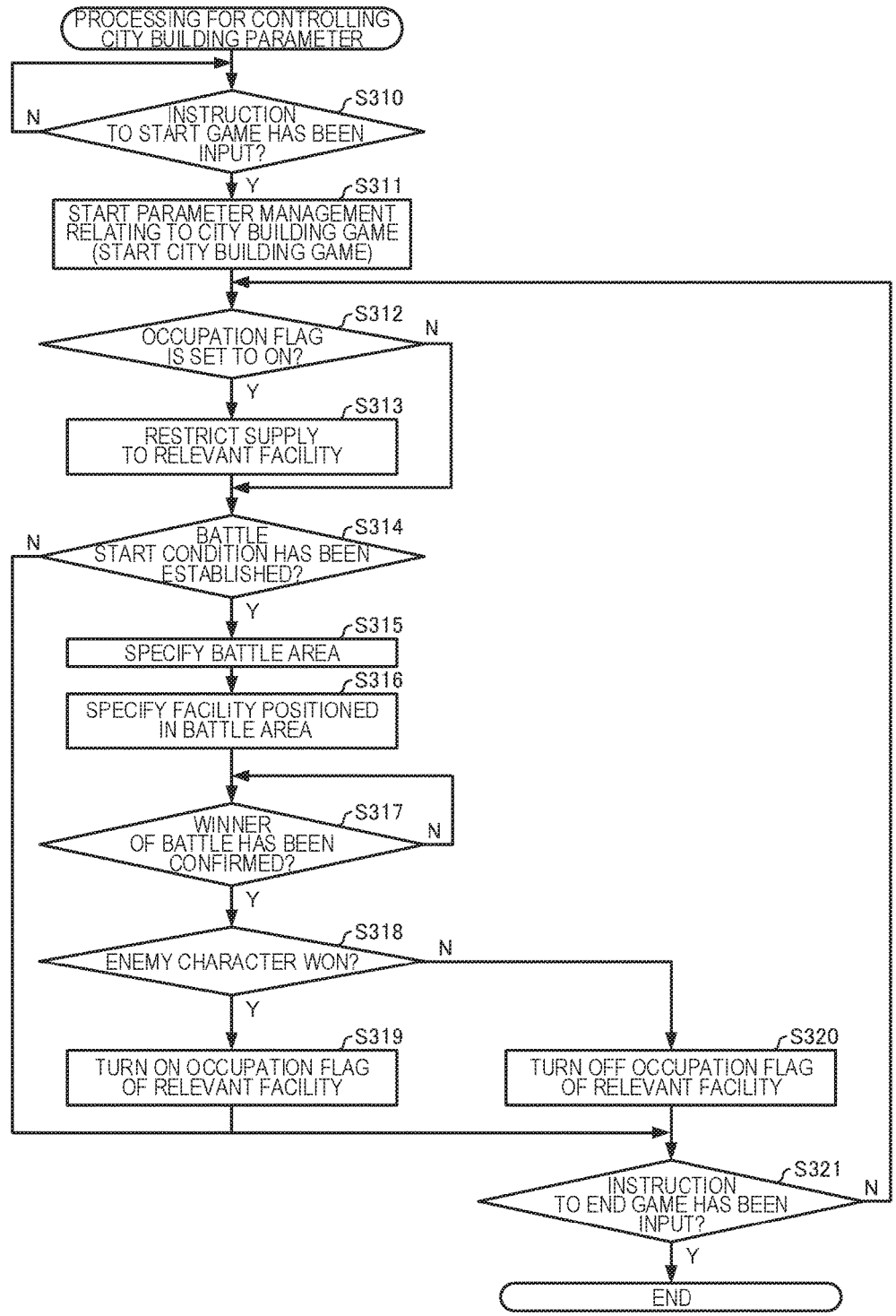
FIG. 15 is a flowchart of processing for controlling a parameter of the city building game.

A flow of processing for controlling a parameter of the city building game (city building game parameter) is now described with reference to FIG. 15. This flow is executed by the game management section 103.

First, the game management section 103 judges whether or not the player has input an instruction to start the game (S310). When it is judged that a start instruction has been input (S310: Y), the game management section 103 advances the processing to the next processing. When it is judged that a start instruction has not been input (S310: N), the game management section 103 repeats the judgment processing (S310).

Next, the game management section 103 starts the city building game, and starts management of parameters of the city building game (S311).

Next, the game management section 103 judges whether a facility having an occupation flag set to ON is present based on the parameter of the city building game (FIG. 12) (S312). When it is judged that such a facility is present (S312: Y), the game management section 103 advances the processing to the next processing (S313). When it is judged that such a facility is not present (S312: N), the game management section 103 skips the next processing (S313).

Next, the game management section 103 limits supply of capital, material, resources, people, and the like to the facility having an occupation flag set to ON (S313).

Next, the game management section 103 judges whether or not a condition for a battle to start has been established (S314). When it is judged that the condition has been established (S314: Y), the game management section 103 advances the processing to the next processing (S315). When it is judged that the condition has not been established (S314: N), the game management section 103 advances the processing to the end judgment processing (S321).

Next, the game management section 103 executes processing for specifying the area relating to the battle (S315).

Next, the game management section 103 executes processing for specifying a facility positioned in the area relating to the battle (S316).

Next, the game management section 103 judges whether or not the winner of the battle game has been confirmed (S317). When it is judged that the winner of the battle game has been confirmed (S317: Y), the game management section 103 advances the processing to the next processing (S318). When it is judged that the winner of the battle game has not been confirmed (S317: N), the game management section 103 repeats the judgment processing (S317).

Next, the game management section 103 judges whether or not the enemy character won (S318). When it is judged that the enemy character won (S318: Y), the game management section 103 advances the processing to first processing (S319). When it is judged that the enemy character did not win (S318: N), the game management section 103 advances the processing to second processing (S320).

As the first processing, the game management section 103 executes processing for turning on the occupation flag of the facility, and processing for writing the identification number of the enemy character in the facility (S319).

As the second processing, when the occupation flag of the facility is ON, the game management section 103 executes processing for turning off the occupation flag and deleting the identification number of the enemy character (S320). In this step, the game management section 103 may also execute, for example, processing for conferring capital, material, resources, people, and the like to the player.

Next, the game management section 103 judges whether or not the player has input an instruction to end the game (S321). When it is judged that an end instruction has been input (S321: Y), the game management section 103 ends the flow. When it is judged that an end instruction has not been input (S321: N), the game management section 103 returns the processing to Step S312.

In the flow described above, within the limits of possibility, the steps may be executed in a different order or omitted.

4-7-3. Battle Parameter Control Processing Flow

Figure 16:
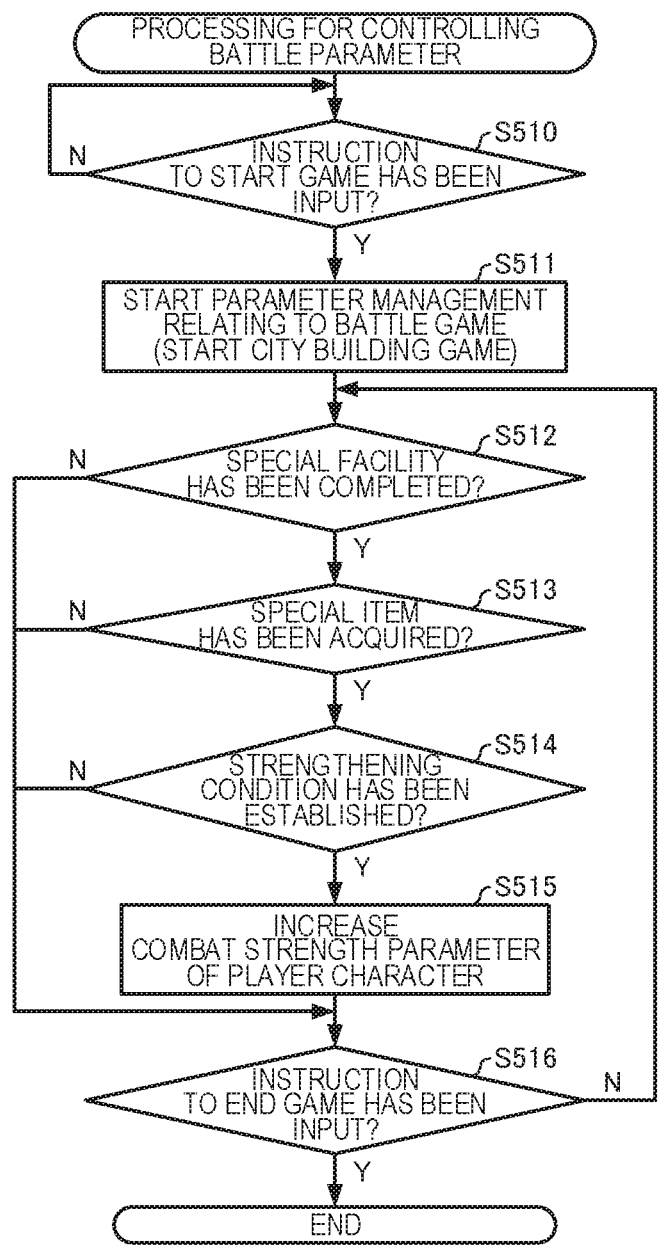
FIG. 16 is a flowchart of processing for controlling a parameter of the battle game.

A flow of processing for controlling a parameter (battle parameter) of the battle game is now described with reference to FIG. 16. This flow is executed by the game management section 103.

First, the game management section 103 judges whether or not the player has input an instruction to start the game (S510). When it is judged that a start instruction has been input (S510: Y), the game management section 103 advances the processing to the next processing. When it is judged that a start instruction has not been input (S510: N), the game management section 103 repeats the judgment processing (S510).

Next, the game management section 103 starts the city building game, and starts management of the parameters of the battle game (S511).

Next, the game management section 103 judges whether or not a special facility has been completed (S512). When it is judged that a special facility has been completed (S512: Y), the game management section 103 advances the processing to the next judgment processing (S513). When it is judged that a special facility has not been completed (S512: N), the game management section 103 advances the processing to the end judgment processing (S516).

Next, the game management section 103 judges whether or not a special item has been acquired by the player (S513). When it is judged that a special item has been acquired (S513: Y), the game management section 103 advances the processing to the next judgment processing (S514). When it is judged that a special item has not been acquired (S513: N), the game management section 103 advances the processing to the end judgment processing (S516).

Next, the game management section 103 judges whether or not the number of special items possessed by the player has reached a predetermined number (S514). When it is judged that the number has reached the predetermined number (S514: Y), the game management section 103 advances the processing to the next processing (S515). When it is judged that the number has not reached the predetermined number (S514: N), the game management section 103 advances the processing to the end judgment processing (S516).

Next, the game management section 103 executes processing for increasing the parameter relating to the combat strength of the player character (S515).

Next, the game management section 103 judges whether or not the player has input an instruction to end the game (S516). When it is judged that an end instruction has been input (S516: Y), the game management section 103 ends the flow. When it is judged that an end instruction has not been input (S516: N), the game management section 103 returns the processing to Step S512.

In the flow described above, within the limits of possibility, the steps may be executed in a different order or omitted.

4-8. Actions and Effects of Embodiment

As described above, according to the above-mentioned game system, while the player is playing a city building game relating to development and the like of his or her own virtual space 1000A (FIG. 5), when the enemy character 1000G appears in the virtual space 1000A (FIG. 6), the player can start to play a battle game in which his or her player character 1000H fights the enemy character 1000G (FIG. 9). The screen of the display section 290 switches from the city building game screen (FIG. 10) to the battle game screen (FIG. 11) at a timing when it is judged that a given condition has been satisfied (FIG. 10), and hence the psychological state of the player can be immediately and forcibly moved from a stable psychological state of "enjoying development and the like" to a tense psychological state of "going into battle".

Further, the above-mentioned game system causes the result of the battle in the battle game to be reflected in a parameter of the city building game (FIG. 12), and hence the player can also get a sense that he or she is "participating in the city building game" when the player plays the battle game. Specifically, the game system controls the parameter in a direction that accelerates progress in the city building game when the player character wins (refer to the cycle of FIG. 3), and controls the parameter in a direction that restricts progress in the city building game when the player character loses (refer to the cycle of FIG. 4). Therefore, the game system is capable of conferring to the player a real sense that his or her own virtual space 1000A is being protected by his or her own player character 1000H.

Therefore, according to the above-mentioned game system, the player can be more strongly attracted to the game by providing timely and effective variety in the city building game.

5. Modified Examples

5-1. Modified Example of Second Game (Deck Setting)

In the above-mentioned system, the introduction order of the player characters in the second game (battle game) is designated by the player each time an enemy character appears. However, this introduction order may be designated in advance by the player.

For example, the game management section 103 causes the player to designate the introduction order of the player characters, and stores in advance the introduction order designated by the player in the user information 146 as deck data. The game management section 103 refers to this deck data when it is judged that an enemy character has appeared in the virtual space 1000A, and causes a player character to be automatically introduced into the virtual space 1000A in accordance with the introduction order stored as deck data.

In this case, there is described an example in which the player is caused to designate the "introduction order of the player characters", but the player may be caused to designate, for example, the "character attribute to be introduced on a priority basis".

5-2. Modified Example of Second Game (Strategy)

The main game of the above-mentioned system is an action game in which a player character performs combat actions in real time in accordance with operations by the player as a second game (battle game). However, the main game may be a strategy game in which the player character performs combat actions based on an automatic calculation by the second game processing section 105. In this case, for example, the game management section 103 may execute the following processing.

More specifically, when it is judged that an enemy character has appeared in the virtual space 1000A, the game management section 103 causes the player to designate the introduction order of the player characters, and causes a player character to be introduced into the virtual space 1000A in accordance with that introduction order. Further, the second game processing section 105 controls the combat actions of the player character introduced into the virtual space 1000A based on an automatic calculation.

Alternatively, the game management section 103 may cause the player to designate the introduction order of the player characters in advance, and store in advance the introduction order designated by the player in the user information 146 as deck data. The game management section 103 refers to this deck data when it is judged that an enemy character has appeared in the virtual space 100A, and causes a player character to be automatically introduced into the virtual space 1000A in accordance with the introduction order stored as deck data. Further, the second game processing section 105 controls the combat actions of the player character introduced into the virtual space 1000A based on an automatic calculation.

In this case, there is described an example in which the player is caused to designate the "introduction order of the player characters", but the player may be caused to designate, for example, the "character attribute to be introduced on a priority basis".

5-3. Modified Example of First Game

The above-mentioned system is based on the assumptions that the first game is a city building game, that at least a part of the virtual space is a developed land, and that the placeable objects in the virtual space are facilities such as factories, parks, artificial lakes, residences, and buildings. However, the placeable objects may be other objects, such as automobiles, bicycles, people, and pets, and the city building game can be modified in various ways in the same manner as known city building games.

The above-mentioned system is based on the assumption that the first game is a city building game, but the first game may be another game that progresses by using objects placed in a virtual space of a player based on operations by the player.

For example, the first game may be a game (farming simulation game) based on the assumption that at least a part of the area of the virtual space is, for example, a farm, an arable land, a green space, a forest, or a wood, and that the placeable objects in the virtual space are plant and animal object such as seeds and seedlings or livestock.

The first game may also be a game (space station construction game) based on the assumption that cosmic space is at least a part of the area of the virtual space, and that the placeable objects in the virtual space are module objects such as residence modules, experiment modules, and food storage modules.

The first game may also be a game (living space design game) based on the assumption that indoor space is at least a part of the area of the virtual space, and that the placeable objects in the virtual space are, for example, furniture, home electric appliances, interior objects, equipment, and miscellaneous goods.

The first game may also be an SNS game in which different areas of the same virtual space are allocated to a plurality of players on an individual basis, and the players or player characters can interact with each other.

5-4. Function Division

The function division of each of the elements included in the above-mentioned processing sections 100 and 200 is not limited to the function division described above.

For example, a part or all of the functions of the game management section 103 may be included in at least one of the first game processing section 104, the second game processing section 105, and the display control section 106.

Further, a part or all of the functions of the first game processing section 104 may be included in at least one of the game management section 103, the second game processing section 105, and the display control section 106.

Further, a part or all of the functions of the second game processing section 105 may be included in at least one of the game management section 103, the first game processing section 104, and the display control section 106.

Further, a part or all of the functions of the display control section 106 may be included in at least one of the game management section 103, the first game processing section 104, and the second game processing section 105.

A part of the functions of the server device 10 may be included on the terminal device 20 side.

A part of the functions of the terminal device 20 may be included on the server device 10 side.

A dedicated circuit (hardware) for implementing a part or all of the functions of the processing section 100 may be included in the server device 10. That is, a part or all of the functions of the processing section 100 can be executed by software or by hardware.

A dedicated circuit (hardware) for implementing a part or all of the functions of the processing section 200 may be included in the terminal device 20. That is, a part or all of the functions of the processing section 200 can be executed by software or by hardware.

5-5. Game Type

According to one embodiment of the present invention, as the battle game, a game may be employed in which, in addition to collaborative play, the player fights against another player in real time. For example, elements from music games, shooting games, sports games such as a baseball game, a soccer game, and a basketball game, and role-playing games (RPG) may be added to the battle game.

5-6. Server Variations

According to one embodiment of the present invention, various games may be provided to the terminal device 20 by one server device 10, or a server system may be constructed by causing a plurality of server devices 10 to operate together so that various games are provided to the terminal device 20.

5-7. Other Modifications

The present invention includes various other configurations substantially the same as the configurations described above in connection with the embodiment (e.g., a configuration having the same function, method, and results, or a configuration having the same object and effects). The present invention also includes a configuration in which an unsubstantial element described above in connection with the embodiment is replaced by another element. The present invention also includes a configuration having the same effects as those of the configurations described above in connection with the embodiment, or a configuration capable of achieving the same object as that of the configurations described above in connection with the embodiment. The present invention further includes a configuration in which a known technology is added to the configurations described above in connection with the embodiment.

Although the exemplary embodiment of the present invention has been described in detail above, those skilled in the art would readily appreciate that many modifications are possible in the embodiment without materially departing from the novel teachings and advantages of the present invention. Accordingly, all such modifications are intended to be included within the scope of the present invention.

What is claimed is:

1. A game system, comprising:
   a memory; and
   a processor, the processor is configured to execute instructions stored in the memory to
      place, based on an operation by a player, an object in a virtual space of the player, and execute a first game that progresses by using the object;
      cause an enemy character to appear in the virtual space, and execute a second game that causes the enemy character and a player character, which have satisfied a given condition, to fight a battle; and
      execute processing that permits the player to perform an operation relating to the second game when it is judged that the given condition has been established in the virtual space during the execution of the first game, and reflect a result of the battle in the second game in a parameter to be used in the first game,
   wherein the processor is further configured to determine the enemy character to be caused to appear in the virtual space in accordance with a player character capable of being introduced by the player into the virtual space.

2. The game system according to claim 1, wherein the processor is further configured to, when it is judged that the given condition has been established, start to receive operation input relating to the second game.

3. The game system according to claim 1, wherein the processor is further configured to enable, when it is judged that the given condition has been established, a display screen of given display means to be switched from a first game screen relating to the first game to a second game screen relating to the second game.

4. The game system according to claim 2, wherein the processor is further configured to enable, when it is judged that the given condition has been established, a display screen of given display means to be switched from a first game screen relating to the first game to a second game screen relating to the second game.

5. The game system according to claim 3, wherein the processor is further configured to specify, when causing the display means to display the second game screen, the object present in an area relating to the battle in the virtual space, and perform control for causing the display means to display at least a part of the object as a background of the second game screen.

6. The game system according to claim 3, wherein the processor is further configured to generate, when causing the display means to display the second game screen, an image of the virtual space by using a virtual camera arranged in an area relating to the battle in the virtual space, and perform control for causing the display means to display the image as a background of the second game screen.

7. The game system according to claim 3,
wherein the display means is a touch panel display, and
wherein the processor is further configured to start, when it is judged that the given condition has been established, display of an image for operation input relating to the second game.

8. The game system according to claim 7, wherein the processor is further configured to end, when it is judged that the battle has ended, the display of the image for operation input relating to the second game.

9. The game system according to claim 1, wherein the processor is further configured to determine, when it is judged that a plurality of combinations of the enemy character and the player character capable of fighting are present simultaneously in the virtual space, a battle order of the plurality of combinations based on a given criterion.

10. The game system according to claim 1, wherein the processor is further configured to set, when it is judged that a plurality of combinations of the enemy character and the player character capable of fighting are present simultaneously in the virtual space, a battle order of the plurality of combinations to an order designated by the player.

11. The game system according to claim 1, wherein the processor is further configured to determine the enemy character to be caused to appear in the virtual space based on a parameter indicating a progress situation of the first game.

12. A game system, comprising:
a memory; and
a processor, the processor is configured to execute instructions stored in the memory to
place, based on an operation by a player, an object in a virtual space of the player, and execute a first game that progresses by using the object;
cause an enemy character to appear in the virtual space, and execute a second game that causes the enemy character and a player character, which have satisfied a given condition, to fight a battle; and
execute processing that permits the player to perform an operation relating to the second game when it is judged that the given condition has been established in the virtual space during the execution of the first game, and reflect a result of the battle in the second game in a parameter to be used in the first game,
wherein the processor is further configured to set an appearance frequency of an enemy character in the virtual space based on a parameter indicating a progress situation of the first game.

13. The game system according to claim 1, wherein the processor is further configured to execute processing that changes, when it is judged that the enemy character won the battle, a parameter of the first game such that progress in the first game is restricted.

14. The game system according to claim 13, wherein the processor is further configured to continue the restriction during a period from when it is judged that the enemy character won the battle until it is next judged that the player character wins the battle.

15. The game system according to claim 14, wherein the processor is further configured to
specify a given object present in an area relating to the battle;
store, when it is judged that the enemy character won the battle, information for associating the given object and the enemy character in given storage;
release the association when it is judged that the player character has won a next battle relating to the given object;
perform restriction on at least the given object relating to the association; and
release the restriction when the association of the given object has been released.

16. The game system according to claim 1, wherein the processor is further configured to execute processing that changes, when a specific object appearing in the virtual space has been acquired by the player, a parameter relating to a combat strength of the player character.

17. The game system according to claim 1, wherein the processor is further configured to execute processing that causes a player character of another player having a given relation with the player to participate in the battle on a side of the player character, and confer to the another player a special advantage in accordance with at least one of a result of the battle or a parameter indicating a progress situation of the first game.

18. A computer-readable non-transitory information storage medium having stored thereon a program for causing a computer to implement a game, the program causing the computer to:
place, based on an operation by a player, an object in a virtual space of the player, and execute a first game that progresses by using the object;
cause an enemy character to appear in the virtual space, and execute a second game that causes the enemy character and a player character, which have satisfied a given condition, to fight a battle; and
execute processing that permits the player to perform an operation relating to the second game when it is judged that the given condition has been established in the virtual space during the execution of the first game, and reflect a result of the battle in the second game in a parameter to be used in the first game,
wherein an appearance frequency of an enemy character in the virtual space is set based on a parameter indicating a progress situation of the first game.

19. A computer-readable non-transitory information storage medium having stored thereon a program for causing a computer to implement a game, the program causing the computer to:
place, based on an operation by a player, an object in a virtual space of the player, and execute a first game that progresses by using the object;
cause an enemy character to appear in the virtual space, and execute a second game that causes the enemy character and a player character, which have satisfied a given condition, to fight a battle; and
execute processing that permits the player to perform an operation relating to the second game when it is judged that the given condition has been established in the virtual space during the execution of the first game, and reflect a result of the battle in the second game in a parameter to be used in the first game,
wherein the enemy character to be caused to appear in the virtual space is determined in accordance with a player character capable of being introduced by the player into the virtual space.

* * * * *